(12) United States Patent
Kajiwara et al.

(10) Patent No.: US 6,909,811 B1
(45) Date of Patent: Jun. 21, 2005

(54) IMAGE PROCESSING APPARATUS AND METHOD AND STORAGE MEDIUM STORING STEPS REALIZING SUCH METHOD

(75) Inventors: Hiroshi Kajiwara, Inagi (JP); Makoto Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/259,252

(22) Filed: Mar. 1, 1999

(30) Foreign Application Priority Data

| Mar. 6, 1998 | (JP) | ............................................ | 10-054946 |
| Jul. 3, 1998 | (JP) | ............................................ | 10-188850 |
| Jul. 3, 1998 | (JP) | ............................................ | 10-188851 |
| Oct. 29, 1998 | (JP) | ............................................ | 10-308683 |

(51) Int. Cl.[7] .............................................. G06K 9/46
(52) U.S. Cl. ...................................... 382/246; 382/240
(58) Field of Search ................................ 382/246, 236, 382/240, 244–245, 247, 251, 250, 232, 233; 358/166, 261.2, 426, 261.1, 430, 455, 458, 427, 261.4, 426.11, 539, 426.1–426.13; 341/67, 65, 79; 375/240.18–240.2, 240.23

(56) References Cited

U.S. PATENT DOCUMENTS

| 5,751,860 | A | * | 5/1998 | Su et al. ...................... 382/244 |
| 5,880,856 | A | * | 3/1999 | Ferriere .................. 358/426.11 |
| 6,263,109 | B1 | * | 7/2001 | Ordentich et al. ........... 382/232 |
| 6,310,978 | B1 | * | 10/2001 | Persiantsev .................. 382/236 |

FOREIGN PATENT DOCUMENTS

| EP | 0 772 364 | 5/1997 | ............ H04N/7/26 |

OTHER PUBLICATIONS

Wallace et al., The JPEG Still Picture Compression Standard, Dec. 1991, IEEE Transaction Cosumer Electronis, pp. 1–17.*

Ordentlich et al. A low Complexity Modeling Approach for Embedded Coding of Wavelet Coefficients, Dec. 1997, Hewlett Packard, HPL–97–150.*

XP– 000614252 Howard and Vitter, "Fast and Efficient Lossless Image Compression", pp. 351 to 360.

XP–002110371 Ordentlich, et al., "A Low–Complexity Modeling Approach for Embedded Coding of Wavelet Coefficients", pp. 408 to 417.

XP–000925102 Memon, "Adaptive Coding of DCT Coefficients By Golomb–Rice Codes", pp. 516 to 520.

XP–000867104 Laurance and Monro, "Embedded DCT Coding with Significance Masking", pp. 2717 to 2720.

XP–000522821 Goh, et al., "Multi–Resolution Based Algorithms For Low Bit–Rate Image Coding", pp. 285 to 289.

XP–000780627, Li, et al., "An Embedded DCT Approach to Progressive Image Compression", pp. 201 to 204.

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

Hierarchical encoding techniques allowing a good compression efficiency and allowing to quickly recognize the outline of an image from a fraction of encoded data. In order to realize such techniques, an image processing apparatus has a generating unit for generating a plurality of coefficients representative of an image, a variable length encoding unit for encoding each of the plurality of coefficients generated by the generating unit, and a hierarchical output unit for distributing each bit of variable length encoded data corresponding to each coefficient and obtained through variable length encoding by the variable length encoding unit, to a plurality of bit planes each corresponding to a level of each bit, and hierarchically and sequentially outputting the plurality of bit planes.

17 Claims, 28 Drawing Sheets

FIG. 3

| PIXEL VALUE | CODE |
|---|---|
| 0 | 0 0 0 |
| 1 | 0 0 1 |
| 2 | 0 1 |
| 3 | 1 0 0 |
| 4 | 1 0 1 |
| 5 | 1 1 0 0 |
| 6 | 1 1 0 1 0 |
| 7 | 1 1 0 1 1 |
| 8 | 1 1 1 0 0 |
| 9 | 1 1 1 0 1 |
| 10 | 1 1 1 1 0 0 |
| 11 | 1 1 1 1 0 1 |
| 12 | 1 1 1 1 1 0 |
| 13 | 1 1 1 1 1 1 0 |
| 14 | 1 1 1 1 1 1 1 0 |
| 15 | 1 1 1 1 1 1 1 1 |

FIG. 7A

| LL | HL |
|---|---|
| LH | HH |

FIG. 7B

| LL | HL | HL |
|---|---|---|
| LH | HH | |
| LH | | HH |

FIG. 7C

| LL/HL3 | HL2 | HL1 |
|---|---|---|
| LH3/HH3 | HH2 | |
| LH2 | | |
| LH1 | | HH1 |

FIG. 8

| FREQUENCY COMPONENT | QUANTIZING STEP q |
|---|---|
| LL | 1 |
| HL3 | 2 |
| LH3 | 2 |
| HH3 | 2 |
| HL2 | 4 |
| LH2 | 4 |
| HH2 | 4 |
| HL1 | 8 |
| LH1 | 8 |
| HH1 | 8 |

FIG. 9

| FREQUENCY COMPONENT | k PARAMETER |
|---|---|
| LL | 4 |
| HL3 | 2 |
| LH3 | 2 |
| HH3 | 2 |
| HL2 | 0 |
| LH2 | 0 |
| HH2 | 0 |
| HL1 | 0 |
| LH1 | 0 |
| HH1 | 0 |

FIG. 10

| V \ K | 0 | 1 | 2 |
|---|---|---|---|
| 0 | 1 | 10 | 100 |
| 1 | 01 | 11 | 101 |
| 2 | 001 | 010 | 110 |
| 3 | 0001 | 011 | 111 |
| 4 | 00001 | 0010 | 0100 |
| 5 | 000001 | 0011 | 0101 |
| 6 | 0000001 | 00010 | 0110 |
| 7 | 00000001 | 00011 | 0111 |

FIG. 11

| COEFFICIENT VALUE (QUANTIZING VALUE) | 3 | 4 | −2 | −5 | −4 | 0 | 1 | ... |
|---|---|---|---|---|---|---|---|---|
| CODE (+/−) | 1 | 1 | 0 | 0 | 0 | 1 | 1 | |
| 1ST PLANE (MSB) | 1 | 0 | 1 | 0 | 0 | 1 | 1 | |
| 2ND PLANE | 1 | 1 | 1 | 1 | 1 | 0 | 0 | |
| 3RD PLANE | 1 | 0 | 0 | 0 | 0 | 0 | 1 | |
| 4TH PLANE | ▨ | 0 | ▨ | 1 | 0 | ▨ | ▨ | |
| ⋮ | | | | | | | | |

CODE PLANE (+/−)    1ST PLANE (MSB)    2ND PLANE

FIG. 14

$\underbrace{1\ 1\ 1}_{3}\ 0\ \underbrace{1\ 1}_{2}\ \underbrace{0\ 0}_{0}\ \underbrace{1\ 1\ 1}_{3}\ 0\ \cdots$

FIG. 15

| RUN-LENGTH | CODE |
|---|---|
| 0 | 0 0 0 |
| 1 | 0 0 1 |
| 2 | 0 1 0 |
| 3 | 0 1 1 |
| 4 | 1 0 0 |
| 5 | 1 0 1 |
| 6 | 1 1 0 |
| 7 | 1 1 1 0 0 0 |
| 8 | 1 1 1 0 0 1 |
| 9 | 1 1 1 0 1 0 |
| 10 | 1 1 1 0 1 1 |
| 11 | 1 1 1 1 0 0 |
| 12 | 1 1 1 1 0 1 |
| 13 | 1 1 1 1 1 0 |
| 14 | 1 1 1 1 1 1 0 |
| 15 | 1 1 1 1 1 1 1 0 |
| 16 | 1 1 1 1 1 1 1 1 |

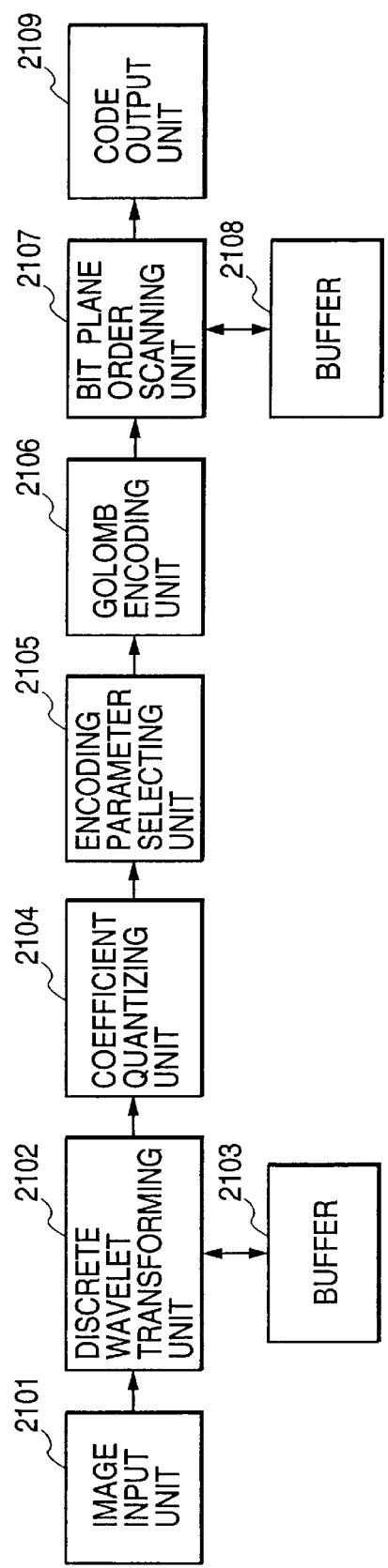

FIG. 18A

| LL | HL |
|---|---|
| LH | HH |

FIG. 18B

| LL | HL | HL |
|---|---|---|
| LH | HH | |
| LH | | HH |

| LL | HL3 | HL2 | HL1 |
|---|---|---|---|
| LH3 | HH3 | HH2 | |
| LH2 | | | |
| LH1 | | | HH1 |

| FREQUENCY COMPONENT | QUANTIZING STEP q |
|---|---|
| LL | 1 |
| HL3 | 2 |
| LH3 | 2 |
| HH3 | 2 |
| HL2 | 4 |
| LH2 | 4 |
| HH2 | 4 |
| HL1 | 8 |
| LH1 | 8 |
| HH1 | 8 |

FIG. 21

| FREQUENCY COMPONENT | k PARAMETER |
|---|---|
| LL | 4 |
| HL3 | 2 |
| LH3 | 2 |
| HH3 | 2 |
| HL2 | 0 |
| LH2 | 0 |
| HH2 | 0 |
| HL1 | 0 |
| LH1 | 0 |
| HH1 | 0 |

FIG. 22

| V \ K | 0 | 1 | 2 |
|---|---|---|---|
| 0 | 1 | 10 | 100 |
| 1 | 01 | 11 | 101 |
| 2 | 001 | 010 | 110 |
| 3 | 0001 | 011 | 111 |
| 4 | 00001 | 0010 | 0100 |
| 5 | 000001 | 0011 | 0101 |
| 6 | 0000001 | 00010 | 0110 |
| 7 | 00000001 | 00011 | 0111 |

| COEFFICIENT VALUE (QUANTIZING VALUE) | 3 | 4 | −2 | −5 | −4 | 0 | 1 | ... |
|---|---|---|---|---|---|---|---|---|
| CODE (+/−) | 1 | 1 | 0 | 0 | 0 | 1 | 1 | |
| 1ST PLANE (MSB) | 1 | 0 | 1 | 0 | 0 | 1 | 1 | |
| 2ND PLANE | 1 | 1 | 1 | 1 | 1 | 0 | 0 | |
| 3RD PLANE | 1 | 0 | 0 | 0 | 0 | 0 | 1 | |
| 4TH PLANE | | 0 | | 1 | 0 | | | |
| ⋮ | | | | | | | | |

1 1 0 0 0 1 1 ··· 1 0 1 0 0 1 1 ··· 1 1 1 1 1 0 0 ···

CODE PLANE (+/−)     1ST PLANE (MSB)     2ND PLANE

FIG. 27

| RANGE OF ACCUMULATED VALUE A | k |
|---|---|
| 0≦A≦1.57706N | 0 |
| 1.57706N≦A≦3.88106N | 1 |
| 3.88106N≦A≦8.35906N | 2 |
| 8.35906N≦A≦19.30669N | 3 |
| 19.30669N≦A≦34.28005N | 4 |
| 34.28005N≦A | 5 |

FIG. 28

| RANGE OF ACCUMULATED VALUE A | k |
|---|---|
| 0≦A≦1.5N | 0 |
| 1.5N≦A≦4N | 1 |
| 4N≦A≦8N | 2 |
| 8N≦A≦16N | 3 |
| 16N≦A≦32N | 4 |
| 32N≦A | 5 |

FIG. 29

```
if (A <= (((N <<1) + (N <<2) +2)>> 2))
  k=0 ;
else {
  for (i=1 ; (N <<i) <A ; i++) ;
  k=i
}
```

| DIFFERENCE D (ABSOLUTE VALUE) | CODE |
|---|---|
| 0 | 1 |
| 1 | 01 |
| 2 | 001 |
| 3 | 0001 |
| 4 | 00001 |
| 5 | 000001 |
| 6 | 0000001 |
| 7 | 00000001 |
| 8 | 000000001 |
| ... | .... |

FIG. 33

| DIFFERENCE VALUE | | -1 | 2 | 0 | 1 | -2 | -3 | -7 | 4 |
|---|---|---|---|---|---|---|---|---|---|
| POSITIVE AND NEGATIVE | | 1 | 0 |  | 0 | 1 | 1 | 1 | 0 |
| CODE | 1 | 0 | 0 | 1 | 0 | 0 | 0 | 0 | 0 |
| | 2 | 1 | 0 | × | 1 | 0 | 0 | 0 | 0 |
| | 3 | × | 1 | × | × | 1 | 0 | 0 | 0 |
| | 4 | × | × | × | × | × | 1 | 0 | 0 |
| | 5 | △ | △ | △ | △ | △ | △ | 0 | 1 |
| | 6 | △ | △ | △ | △ | △ | △ | 0 | △ |
| | 7 | △ | △ | △ | △ | △ | △ | 0 | △ |
| | 8 | △ | △ | △ | △ | △ | △ | 1 | △ |

FIG. 34

1'ST BIT PLANE    0 0 1 0 0 0 0 0 .... (1 0 0 1 1 1 0 ....)

2'ND BIT PLANE    1 0 1 0 0 0 1 ....

3'RD BIT PLANE    1 1 0 0 ....

4'TH BIT PLANE    1 0 0 0 0 1 0 1
(LAST BIT PLANE)

FIG. 36A

| LL | HL |
|---|---|
| LH | HH |

FIG. 36B

| LL | HL | HL |
| LH | HH | |
| LH | | HH |

FIG. 36C

| LL | HL2 | HL1 | |
| LH3 HH3 (HL3) | | | |
| LH2 | HH2 | | |
| LH1 | | HH1 | |

FIG. 37

| FREQUENCY COMPONENT | QUANTIZING STEP q |
|---|---|
| LL | 1 |
| HL3 | 2 |
| LH3 | 2 |
| HH3 | 2 |
| HL2 | 4 |
| LH2 | 4 |
| HH2 | 4 |
| HL1 | 8 |
| LH1 | 8 |
| HH1 | 8 |

FIG. 38

| FREQUENCY COMPONENT | k PARAMETER |
|---|---|
| LL | 4 |
| HL3 | 2 |
| LH3 | 2 |
| HH3 | 2 |
| HL2 | 0 |
| LH2 | 0 |
| HH2 | 0 |
| HL1 | 0 |
| LH1 | 0 |
| HH1 | 0 |

FIG. 39

| k | 0 VARIABLE LENGTH UNIT | 0 FIXED LENGTH UNIT | 1 VARIABLE LENGTH UNIT | 1 FIXED LENGTH UNIT | 2 VARIABLE LENGTH UNIT | 2 FIXED LENGTH UNIT | 3 VARIABLE LENGTH UNIT | 3 FIXED LENGTH UNIT |
|---|---|---|---|---|---|---|---|---|
| 0 | 1 | | 1 | 0 | 1 | 00 | 1 | 000 |
| 1 | 01 | | 1 | 1 | 1 | 01 | 1 | 001 |
| 2 | 001 | | 01 | 0 | 1 | 10 | 1 | 010 |
| 3 | 0001 | | 01 | 1 | 01 | 11 | 1 | 011 |
| 4 | 00001 | | 001 | 0 | 01 | 00 | 1 | 100 |
| 5 | 000001 | | 001 | 1 | 01 | 01 | 1 | 101 |
| 6 | 0000001 | | 0001 | 0 | 01 | 10 | 1 | 110 |
| 7 | 00000001 | | 0001 | 1 | 01 | 11 | 1 | 111 |
| 8 | 000000001 | | 00001 | 0 | 001 | 00 | 01 | 000 |
| ... | | | | | | | | |

FIG. 40

| COEFFICIENT VALUE (QUANTIZING VALUE) | | 3 | 4 | -2 | -5 | -8 | -17 | -20 | 0 | 1 | ... |
|---|---|---|---|---|---|---|---|---|---|---|---|
| CODE (+/−) | | | 1 | 0 | 0 | 0 | 0 | 0 | — | 1 | |
| CODE | 1ST PLANE | 1 | 1 | 0 | 0 | 0 | 0 | 0 | 1 | 1 | |
| | 2ND PLANE | × | 0 | 1 | 0 | 0 | 0 | 0 | — | × | |
| | 3RD PLANE | × | 1 | × | 1 | 0 | 0 | 0 | × | × | |
| | 4TH PLANE | × | × | × | × | 1 | 0 | 0 | × | × | |
| | 5TH PLANE | ◁ | ◁ | ◁ | ◁ | ◁ | 1 | 0 | ◁ | ◁ | |
| | 6TH PLANE | ◁ | ◁ | ◁ | ◁ | ◁ | ◁ | 1 | ◁ | ◁ | |
| | ... | | | | | | | | | | |
| FIXED LENGTH UNIT | 1ST PLANE | 1 | 0 | 1 | 1 | 0 | 0 | 0 | 0 | 0 | |
| | 2ND PLANE | 1 | 0 | 0 | 1 | 0 | 1 | 0 | 0 | 1 | |

IMAGE PROCESSING APPARATUS AND METHOD AND STORAGE MEDIUM STORING STEPS REALIZING SUCH METHOD

BACKGROUND OF THE INVENTION

1. Field of the Invention

The present invention relates to an image processing apparatus and method for encoding image data, and to a storage medium storing processes of such a method.

2. Related Background Art

Image, particularly a multi-value image, contains a very large amount of information. The data amount required for storing or transmitting such an image is bulky. In storing or transmitting an image, therefore, high efficiency encoding is used to reduce the data amount by removing a redundancy of an image or changing the contents of an image to a degree that deterioration of the image is not visually recognizable.

However, even if the data amount can be reduced to some degree by incorporating high efficiency encoding, it takes in some cases a relatively long time to transmit or read the encoded data. It is desired to use hierarchical encoding by which a reception side receiving transmitted encoded data can recognize the outline of an image at an earlier stage of data reception and can gradually recognize a high quality image as the remaining encoded data is received.

With conventional hierarchical encoding, image data of each pixel represented by multi-value is converted into a plurality of bit planes and the bit planes are transmitted in the order from an upper level bit plane to a lower level bit plane.

For example, JPEG which was recommended by ISO and ITU-T as an international standard encoding scheme for still images, stipulates several types of encoding methods in accordance with a use objective of the contents of an image to be encoded or of the encoded data. For example, JPEG stipulates SS (Spectrum Selection) and SA (Successive Approximation) which realize hierarchical encoding during extended DCT processes.

The details of JPEG are described in ITU-T Recommendation T.81, ISO/IEC 10981-1, and so the description thereof is omitted. With SA, an image of each block is subject to discrete cosine transform (DCT), and all the frequency components are quantized into n-bit coefficients. A plurality of coefficients thus obtained are converted into n hierarchical levels (n to 1), and the bit planes are transmitted in the order from an upper level bit plane to a lower level bit plane.

With this conventional bit plane encoding method in which image data of multi-value is converted into a predetermined number of hierarchical level bit planes, and the bit planes are output hierarchically, however, there is still a redundancy in bit planes.

Also with a conventional hierarchical encoding, if the reception side receives only higher level bit planes, it is not easy to recognize the outline of an encoded multi-value image at an earlier stage of data reception.

SUMMARY OF THE INVENTION

It is an object of the present invention to solve the above problems and provide hierarchical encoding techniques allowing a high compression efficiency and allowing to recognize the outline of an image at an earlier stage from a fraction of encoded data.

In order to achieve the above object of the invention, a preferred embodiment provides an image processing apparatus comprising: means for generating a plurality of coefficients representative of an image; variable length encoding means for encoding each of the plurality of coefficients generated by the generating means; and hierarchical output means for distributing each bit of variable length encoded data corresponding to each coefficient and obtained through variable length encoding by the variable length encoding means, to a plurality of bit planes each corresponding to a level of each bit, and hierarchically and sequentially outputting the plurality of bit planes.

It is another object of the present invention to suppress an increase in the number of bit planes as much as possible during bit plane encoding.

In order to achieve the above object of the invention, a preferred embodiment provides the image processing apparatus as such, wherein the hierarchical output means distributes each bit of variable length encoded data corresponding to each coefficient and obtained through variable length encoding by the variable length encoding means, to a plurality of bit planes each corresponding to a level of each bit, and hierarchically and sequentially outputting the limited number of bit planes of the plurality of bit planes.

The other objects and features of the invention will become apparent from the following detailed description of the embodiments when read in conjunction with the accompanying drawings.

BRIEF DESCRIPTION OF THE DRAWINGS

FIG. 3 shows an example of a code list stored in a code list memory 105.

FIGS. 7A, 7B and 7C are diagrams illustrating two-dimensional wavelet transform.

FIG. 8 is a diagram showing a correspondence between frequency components and quantizing step.

FIG. 9 is a diagram showing a correspondence between frequency components and encoding parameters k.

FIG. 10 shows an example of Golomb codes.

FIG. 11 is a diagram showing a bit plane structure.

FIG. 12 shows a code train output from a bit plane sequential scanning unit 606.

FIG. 14 shows an example of transform from a bit train to a run-length by a run-length encoding unit 1308.

FIG. 15 illustrate encoding by the run-length encoding unit 1308.

FIG. 17 is a block diagram showing an image processing apparatus according to a fifth embodiment of the invention.

FIGS. 18A, 18B and 18C are diagrams illustrating two-dimensional wavelet transform.

FIG. 21 is a diagram showing a correspondence between frequency components and encoding parameters k.

FIG. 22 is a diagram showing a correspondence between quantizing coefficients and encoding parameters k.

FIG. 27 is a diagram illustrating a method of determining an encoding parameter according to an eighth embodiment.

FIG. 28 is a diagram illustrating a method of determining an encoding parameter according to a ninth embodiment.

FIG. 29 shows an algorithm for determining an encoding parameter.

FIG. 33 is a diagram illustrating bit plane division.

FIG. 34 is shows data output from a bit plane sequential scanning unit 3108.

FIGS. 36A, 36B and 36C are diagrams illustrating two-dimensional wavelet transform.

FIG. 37 is a diagram showing a correspondence between frequency components and quantizing step.

FIG. 38 is a diagram showing a correspondence between frequency components and encoding parameters k.

FIG. 39 shows an example of Golomb codes.

FIG. 40 is a diagram showing a bit plane structure.

DETAILED DESCRIPTION OF THE PREFERRED EMBODIMENTS

Each of preferred embodiments of the invention will be described in the following.

(First Embodiment)

A typical embodiment of the invention will be described with reference to the accompanying drawings.

Figure 1:
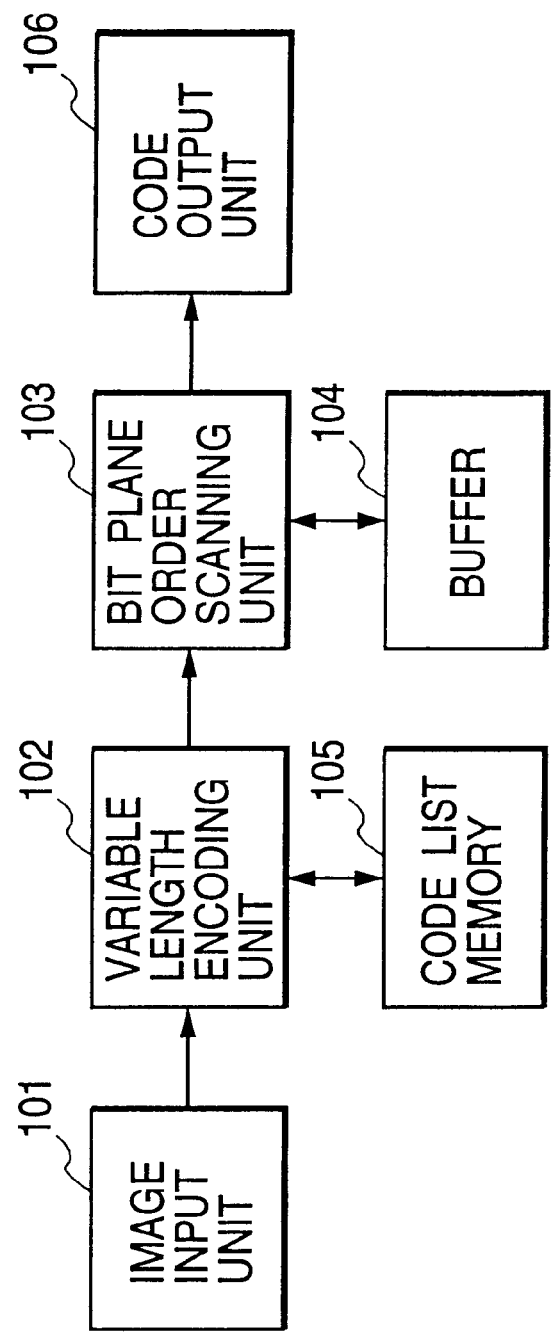
FIG. 1 is a block diagram showing an image processing apparatus according to a first embodiment of the invention.

FIG. 1 is a block diagram of an image processing apparatus according to the first embodiment of the invention.

In FIG. 1, reference numeral 101 represents an image input unit, reference numeral 102 represents a variable length encoding unit, reference numeral 103 represents a bit plane sequential (order) scanning unit, reference numeral 104 represents a buffer, reference numeral 105 represents a code list memory, and reference numeral 106 represents a code output unit.

In the description of this embodiment, it is assumed that monochrome image data having four bits per pixel is encoded. However, the invention is not limited thereto, but is also applicable to encoding a monochrome image having eight bits per pixel and a multi-value color image having eight bits per color component of each pixel (RGB/Lab/YCrCb). In encoding multi-value information representative of the state of each pixel or the like constituting an image, the invention is also applicable to, for example, encoding a multi-value index value representative of color of each pixel. When the invention is applied to those cases, multi-value information of various types is encoded by processing it as monochrome image data to be described later.

The operation of each unit of the embodiment will be described in detail.

Image data (pixel data) of an image to be encoded is successively input from the image input unit 101 in the order of raster scan. The image input unit 101 may be a scanner, an image pickup device of a digital camera or the like, an image pickup device such as a CCD, an interface to a network, or the like. The image input unit 101 may also be a storage device such as a RAM, a ROM, a hard disk, and a CD-ROM.

Figure 2:
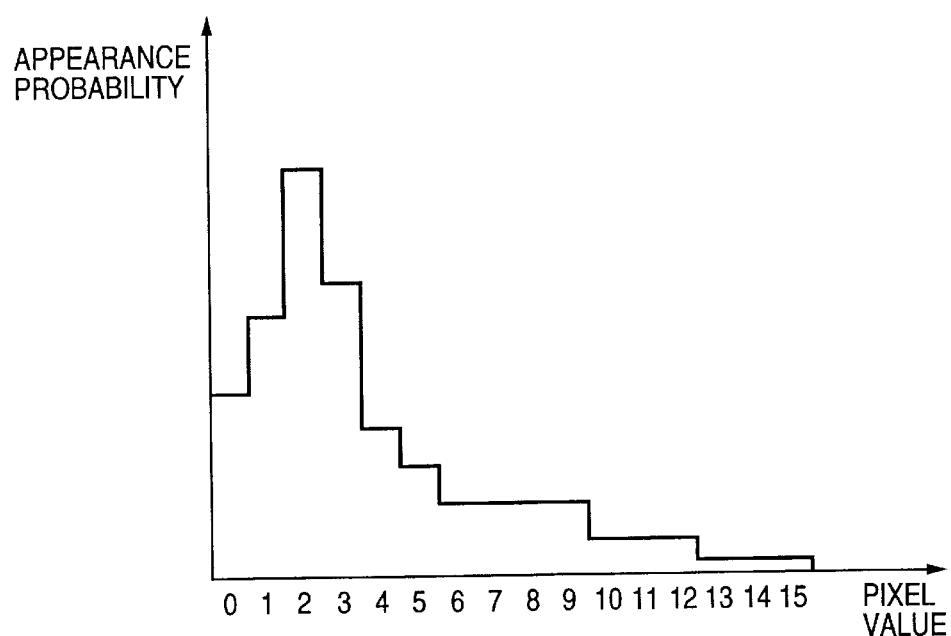
FIG. 2 is a graph showing an occurrence frequency distribution of images to be encoded.

FIG. 2 shows an occurrence frequency distribution of pixel data supplied from the image input unit 101.

In this embodiment, it is assumed as shown in FIG. 2 that of a plurality of pixel data to be encoded, the pixel data having a small value has a high occurrence frequency and the pixel data having a large value has a low occurrence frequency.

Such a deviation of the occurrence frequency distribution results from the characteristics of the image input unit 102 or the characteristics of an image itself to be encoded. If a CCD is used as the image input unit 101, an occurrence frequency deviation is likely to be generated unless the gamma correction is performed. Although not shown, the occurrence frequency distribution deviation such as shown in FIG. 2 may be intentionally formed by performing a preprocess between the image input unit and the variable length code encoding unit. This case is also intended to be included in the scope of the invention.

The variable length code encoding unit 102 variable-length encodes the pixel data supplied from the image input unit 101, by referring to a code list stored in the code list memory 105.

FIG. 3 shows an example of a code list stored in the code list memory 105, the code list being stored in the code list memory 102 prior to variable length encoding. This code list stored in the code list memory 102 is generated in accordance with a typical occurrence frequency distribution of pixel data of sample images which is assumed to be the occurrence frequency distribution shown in FIG. 2. Each code shown in FIG. 2 is basically assigned a short code for a high occurrence frequency pixel data (pixel value). The invention is not limited only to using one code list, but is also applicable to selectively using a plurality of code lists. In such a case, the contents (occurrence frequency of each pixel data) of an image to be encoded are actually measured and in accordance with the measurement result, an optimum one is selected from a plurality of code lists.

In the code list of the embodiment shown in FIG. 3, since the code is transferred to the succeeding stage sequentially for each bit plane, the variable length code is determined so that whether pixel data is in a range from 0 to 2 or in a range of 3 or higher can be discriminated from "0" or "1" of MSB (highest level bit) of the pixel data. Namely, while each variable length code is decoded starting from the upper bit, the next lower bit has consecutive candidates of decoded pixel values. This can be realized by forming code trees through combination of only two adjacent pixel values in the process of forming a code tree by repetitively combining two pixel values of low occurrence frequencies in the algorithm of Huffman coding.

With such assignment of variable length codes, it is possible to efficiently limit the density area hierarchically in accordance with the density range of each pixel when the encoded data is output for each bit plane as will be described later. More specifically, even if the reception side of encoded data receives only the first one bit (MSB) of each pixel as the bit plane to be described later, it is possible to quickly judge whether each pixel has a large occurrence frequency and high density. Therefore, the outline of an image can be made very clear. Similarly, when the bit plane of the following upper bit is received, the density limit for each pixel can be determined more efficiently. In contrast, when a first bit (MSB) is received after the multi-value pixel value is hierarchically output for each bit plane, it can know conventionally only whether the density of each pixel is higher or lower than a median value. Therefore, if the density of the whole area of an image is low or high, the reception side cannot know the outline of the image from the encoded pixel data.

The variable length encoding unit 102 sequentially encodes the input pixel data. For example, if the input pixel value is "0", the code "000" is output, if the pixel value is "1", the code "001" is output, and if the pixel value is "2", the code "01" is output.

The bit plane sequential scanning unit 103 temporarily stores the variable length encoded data output from the variable length encoding unit 102 in the buffer 104. The highest bit (MSB) of the variable length encoded data is stored as binary data of the first bit plane, and the next highest bit is stored as binary data of the second bit plane. The position of the binary data in each bit plane is controlled so as to make it correspond to the position of the pixel of the original image encoded. Similarly, each bit constituting the variable length encoded data is stored in the buffer 104 as binary data of the third bit plane, fourth bit plane, . . . , in the order of higher bit.

As will be later described, since the data is variable-length encoded, whether bits constituting the encoded data are stored up to which bit plane is different for each pixel.

For example, if the variable length encoded data output from the variable length encoding unit 102 is "101", "1" is stored in the first bit plane, "0" is stored in the second bit plane, "1" is stored in the third bit plane, and no data is stored in the fourth and following bit planes. If the variable length encoded data output from the variable length encoding unit 102 is "110101", data is stored up to the fifth bit plane.

Figure 4:
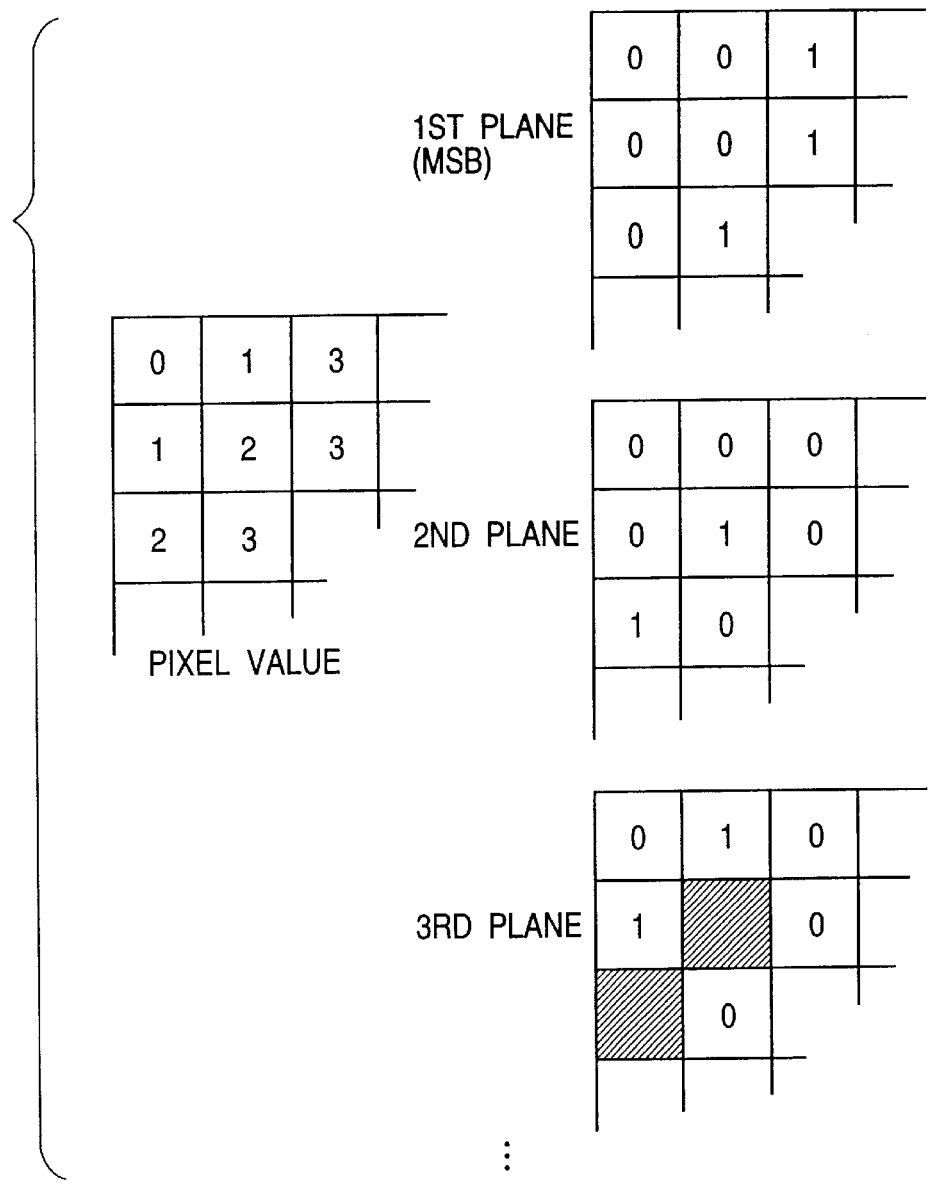
FIG. 4 is a diagram showing a bit plane structure.

FIG. 4 shows bit planes storing a series of image data "0, 1, 2, . . . , 1, 2, 3, . . . , 2, 3, . . . " encoded by the variable length encoding unit 102.

Hatched blanks in the third plane indicate that no data is stored because the variable length code is terminated at the upper second plane.

The bit plane sequential scanning unit 103 receives the encoded data of one frame from the variable length encoding unit 102 and stores it in the buffer 104. Next, the bit plane sequential scanning unit 103 reads bit information "1/0" of each bit plane from the buffer 104 in the order of raster scan, starting from the upper level bit plane to the lower level bit plane, such as the first bit plane (MSB), second bit plane, . . . .

Figure 5:
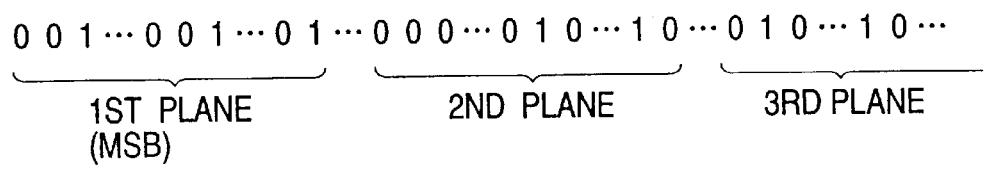
FIG. 5 shows encoded data output from a bit plane sequential scanning unit 103.

FIG. 5 shows the sequential order of encoded data (bit information) sent back from the buffer 104. The hatched blanks shown in FIG. 4 are skipped when reading. Namely, in the second line of the third bit plane shown in FIG. 4, after the left "1" is read, the next hatched blank is skipped, and then the next "0" is read. In the third line, the left hatched blank of one pixel is skipped and then the next "0" is first read. When the decoding reception side receives the data read as shown in FIG. 5, the reception side knows that the data was read sequentially from the upper level bit plane and output, so that the hatched blanks shown in FIG. 4 can be anticipated.

As compared to outputting a fixed length pixel bit for each bit plane, the data format of this embodiment can reduce the code amount considerably.

The encoded data in the unit of bit plane shown in FIG. 5 is transmitted to a memory or an external apparatus by the code output unit 106. The code output unit 106 may be a storage device such as a hard disk, a RAM, a ROM, and a DVD, or an interface to a public telephone line, a radio line, a LAN or the like.

With the above coding process, an outline of an image can be captured efficiently at the reception side even if the data is hierarchically transmitted starting from the upper level bit plane. As compared to a usual coding for each bit plane, the total code amount can be reduced.

The encoded data of the embodiment is added when necessary with image size information or list designation information for designating a code list stored in the code list memory 105 (an index indicating which code list among a plurality of code lists was used, or specific data indicating a correspondence between pixel data in a code list and a variable length code). For example, if an image is processed in the unit of line, block, or band, the image size information is necessary. If the code list memory 105 stores a plurality of code lists and each list is selectively used in accordance with the contents of an image, the above-described list designation information is necessary.

(Second Embodiment)

Next, the second embodiment of the invention will be described with reference to the accompanying drawings.

In the description of this embodiment, it is assumed that monochrome image data having eight bits per pixel is encoded. However, the invention is not limited thereto, but is also applicable to encoding a monochrome image having four bits per pixel and a multi-value color image having eight bits per color component of each pixel (RGB/Lab/YCrCb). In encoding multi-value information representative of the state of each pixel or the like constituting an image, the invention is also applicable to, for example, encoding a multi-value index value representative of color of each pixel. When the invention is applied to those cases, multi-value information of various types is encoded by processing it as monochrome image data to be described later.

Figure 6:
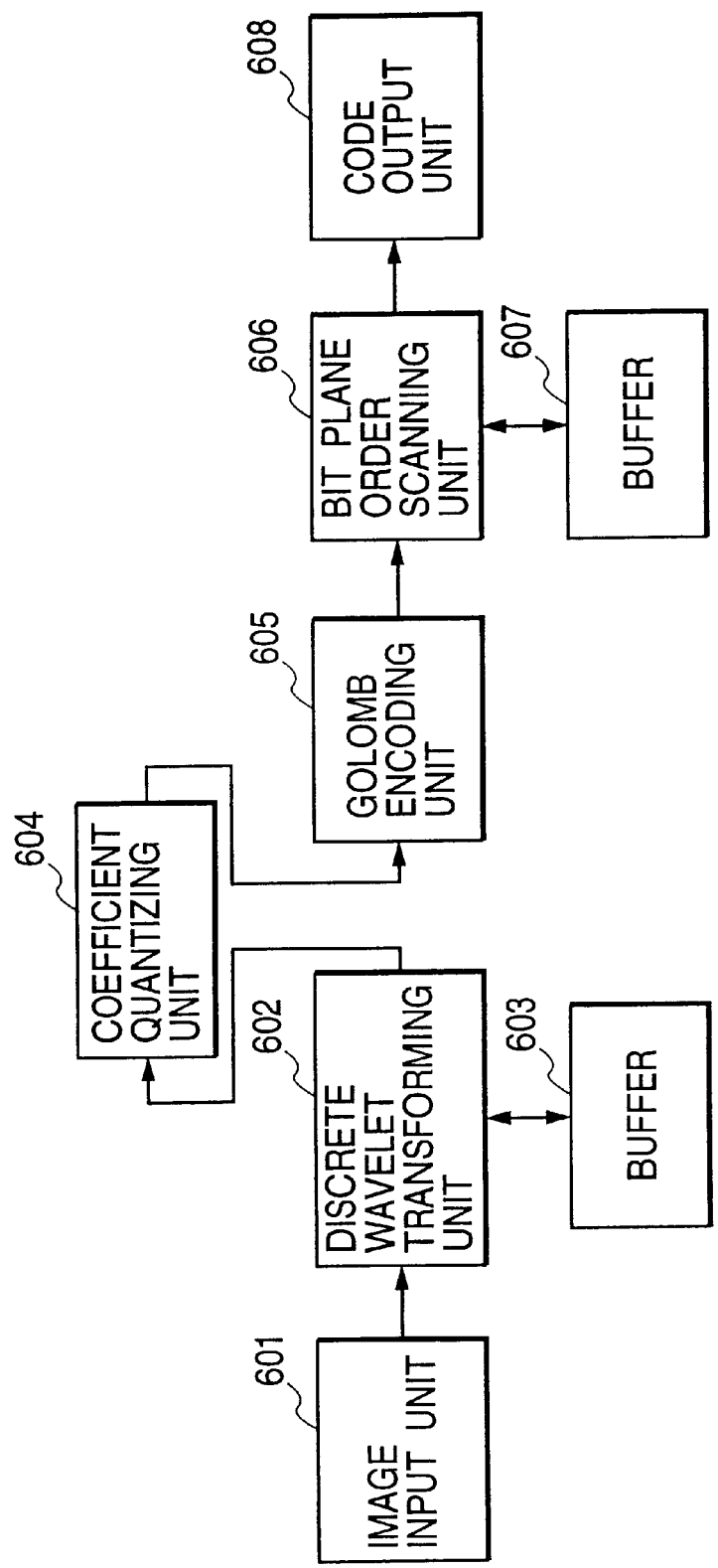
FIG. 6 is a block diagram showing an image processing apparatus according to a second embodiment of the invention.

FIG. 6 is a block diagram of an image processing apparatus according to the second embodiment of the invention. In FIG. 6, reference numeral 601 represents an image input unit, reference numeral 602 represents a discrete wavelet transforming unit, reference numeral 603 represents a buffer, reference numeral 604 represents a coefficient quantizing unit, reference numeral 605 represents a Golomb encoding unit, reference numeral 606 represents a bit plane sequential (order) scanning unit, reference numeral 607 represents a buffer, and reference numeral 608 represents a code output unit.

Image data of an image to be encoded is successively input from the image input unit 601 in the order of raster scan. The image input unit 601 may be a scanner, an image pickup device of a digital camera or the like, an image pickup device such as a CCD, an interface to a network, or the like. The image input unit 601 may also be a storage device such as a RAM, a ROM, a hard disk, and a CD-ROM.

The discrete wavelet transforming unit 602 temporarily stores image data of one frame input from the image input unit 601 in the buffer 603. Next, the image data of one frame stored in the buffer 603 is subject to known discrete wavelet transform, and is separated into a plurality of frequency bands. In this embodiment, the discrete wavelet transform for an image data train x(n) is performed by the following equations:

$$r(n)=\text{floor}\{(x(2n)+x(2n+1))/2\}$$

$$d(n)=x(2n+2)-x(2n+3)+\text{floor}\{(-r(n)+r(n+2)+2)/4\}$$

where r(n) and d(n) are transform coefficients, r(n) are for low frequency components, and d(n) are for high frequency components. In the above equations, floor {X} indicates a maximum integer not larger than X. Although these transform equations are applied to one-dimensional data, two-dimensional transform is possible by performing transform in the horizontal and vertical directions. For example, the pixel data can be divided into four frequency bands (sub-blocks) LL, HL, LH, and HH such as shown in FIG. 7A.

The generated LL components are also subject to the discrete wavelet transform in the similar manner as above, so that the pixel data is divided into seven frequency components (sub-blocks) such as shown in FIG. 7B. In this embodiment, the pixel data is subject once more to the discrete wavelet transform to divide it into ten frequency blocks (sub-blocks) LL, HL3, HH3, HL2, LH2, HH2, HL1, LH1, and HH1 such as shown in FIG. 7C.

The transform coefficients are output to the coefficient quantizing unit 604 in the order of raster scan, in the unit of sub-block, and in the order of sub-blocks LL, HL3, HH3, HL2, LH2, HH2, HL1, LH1, and HH1.

The coefficient quantizing unit 604 quantizes each of the wavelet transform coefficients output from the discrete wavelet transforming unit 602 at a quantizing step determined for each group of the frequency components, and outputs the quantized value to the Golomb encoding unit 605. The quantized coefficient value Q(X) is given by the following equation, by representing the coefficient value by X and the quantizing step value for the frequency components the coefficient value belongs by q:

$$Q(X)=\text{floor}\{(X/q)+0.5\}$$

where floor {X} indicates a maximum integer not larger than X. A correspondence between the frequency components and the quantizing step of this embodiment is shown in FIG. 8. As shown in FIG. 8, the quantizing step is made large for the high frequency components (such as HL1, LH1, and HH1) than for the low frequency components (such as LL).

The Golomb encoding unit 605 encodes the coefficient value quantized by the coefficient quantizing unit 604, and outputs a code. The encoded data for the quantized value is constituted of a sign bit representative of plus/minus (+/−) and a Golomb code for the absolute value of the quantized value.

The Golomb code can easily generate variable length codes by setting an encoding parameter k, the variable length codes corresponding to k occurrence frequency (occurrence possibility) distributions each having a different occurrence frequency degree of reducing its occurrence frequency from the highest occurrent frequency (0 for the Golomb coding) toward the lower occurrence frequency. More specifically, if the parameter k used for Golomb coding is set small, the pixel data group to be encoded and having a large occurrence frequency degree of reducing its occurrence frequency of pixel data to be from the highest occurrent frequency toward can be efficiently encoded, whereas if the parameter k is set large, the pixel data group having a small occurrence frequency degree of reducing its occurrence frequency of pixel data to be from the highest occurrent frequency toward can be efficiently encoded. For example, if the parameter k is set to 0 when encoding an image having a highest occurrence frequency of "0", the image data group having an occurrence frequency distribution having a large occurrence frequency reduction degree, such as a "0" occurrence frequency of ½ and a "1" occurrence frequency of ¼, can be efficiently encoded.

This embodiment provides a good encoding efficiency, particularly when a natural image is encoded. Namely, the occurrence probability distribution of transform coefficients obtained through wavelet transform of pixel data of a natural image has a tendency that the occurrence frequency of each sub-block of HL3, . . . , HH1 excepting LL components gradually reduces from the center of 0 (highest occurrence frequency) toward both the positive (+1, . . . ) and negative (−1, . . . ) sides. In the Golomb encoding, the transform coefficients (quantized values) arranged in the order of smaller absolute value such as 0, 1, −1, 2, −2, . . . are subject to variable length encoding by assigning variable length codes starting from the shortest code in the above order.

Since the transform coefficients obtained through wavelet transform is subject not to mere variable length encoding but to Golomb encoding, the compression effects can be improved.

A general natural image encoded in this embodiment has a tendency that the transform coefficients for the high frequency components (e.g., HH1) has a larger reduction degree from the highest occurrence frequency toward the lower occurrence frequency than the transform coefficients for the low frequency components (e.g., HH3). Also in this embodiment, since the transform coefficients for the high frequency components are quantized more roughly than those for the low frequency components, it can be assumed that the occurrence frequency distribution of the quantized values for the high frequency components has a reduction degree from the highest occurrence frequency (in this embodiment, 0) toward the lower occurrence frequency larger than that of the quantized values for the low frequency components. On such assumption, the encoding parameter k is set. A correspondence between the frequency components and encoding parameters k of this embodiment is shown in FIG. 9.

Since the fundamental method of the Golomb encoding to be executed by the Golomb encoding unit 605 is well known, only the fundamental operation of encoding and features of the invention will be briefly described.

The Golomb encoding unit 605 checks the sign (plus/minus) of each of sequentially inputted quantized values, and outputs a sign (+/−) bit. Specifically, if the quantized value is 0 or plus, a sign bit of "1" is output, whereas if it is minus, a sign bit of "0" is output.

Next, the absolute value of the quantized value is subject to Golomb encoding. Each quantized value having an absolute value V and belonging to the frequency components set with the encoding parameter k is Golomb encoded in the following manner. First, V is shifted right by k-bit, and its integer value m is calculated. The Golomb code of V is a combination of m "0's" followed by "1" and the lower k-bit of V. Examples of Golomb bits for k=0, 1, and 2 are shown in FIG. 10.

In the Golomb coding, encoding and decoding can be performed without using a code list (such as a table shown in FIG. 3 indicating a correspondence between an input value and a variable length code). Also in the Golomb coding, as described with FIG. 3 of the first embodiment, while the variable length codes are checked sequentially and hierarchically from the upper bits, the range of decoded values for the following lower bits can be sequentially limited. Therefore, when these variable length codes are hierarchically output for each bit plane, the reception side can recognize the outline of a decoded image quickly and efficiently.

The sign (+/−) and Golomb encoded data of each input quantized value generated as above are output to the bit plane sequential scanning unit 606.

The bit plane sequential scanning unit 606 processes on the frequency components (sub-block) unit basis. The encoded data of one set of frequency components (one sub-block of LL to HH1) is stored in the buffer 607. The sign (+/−) bit of each pixel generated by the Golomb encoding unit 605 is stored in a sign bit plane, and the start bit (MSB) of the Golomb code of each pixel is stored in a first bit plane, and the second bit is stored in a second bit plane. Similarly, the third and following bits are sequentially stored in third and following bit planes. This process is similar to the first embodiment. In the above manner, the encoded data of each pixel is stored in the buffer as a plurality of bit planes.

For example, if the code output from the Golomb encoding unit 605 is "0110", "0" is stored in the sign bit plane, "1" is stored in the first bit plane, "1" is stored in the second bit plane, and "0" is stored in the third bit plane. In the case of this data "0110", bit information is not stored in the fourth bit plane.

FIG. 11 shows a data series "3, 4, −2, −5, −4, 0, 1, . . . " of coefficients (quantized values) of HL3 frequency components encoded by the Golomb encoding unit 605 and stored in bit planes. The hatched blanks shown in FIG. 11 have no bit information stored therein because the encoded data was terminated at their upper level planes. The bit plane sequential scanning unit 606 receives encoded data of one set of frequency components (one sub-block of LL to HH1) from the Golomb encoding unit 605 and stores it in the butter 607. Thereafter, it reads information from each bit in the order of raster scan, from the sign bit plane, first bit plane, second bit plane, . . . , i.e., after the sign bit plane from the upper to lower bit planes, and outputs it to the code output unit 608. FIG. 12 shows the data format of the bit information stored in the buffer 607 and sequentially output in the order of bit plane.

The hierarchical output of the bit planes is performed in the order from the low frequency components sub-block LL, to HL3, LH3, HH3, HL2, LH2, HH2, HL1, LH1, and to HH1.

The code output unit 608 sequentially and hierarchically transmits a plurality set of bit plane data. The code output unit 608 may be an interface to a public telephone line, a radio line, a LAN or the like, or a storage device such as a hard disk, a RAM, a ROM, and a DVD.

With the above coding process, an image is transmitted hierarchically in the order from low frequency components to high frequency components, and the reception side can recognize an outline of the image hierarchically. Furthermore, since each bit plane of frequency components is hierarchically transmitted, the reception side can recognize an outline of the image for the frequency components hierarchically. Still further, similar to the first embodiment, since each pixel (transform coefficient) is represented by a variable length code, the total code amount can be reduced more than a usual coding for each bit plane.

The encoded data of the embodiment is added when necessary with information necessary for the decoding side such as an image size, the number of bits per pixel, a quantization step for respective frequency components, and encoding parameters k. For example, if an image is processed in the unit of line, block, or band, the image size information is necessary.

(Third Embodiment)

In the second embodiment, bit information in each bit plane is directly output. In this case, each quantized value obtained by wavelet transform requires at least two bits, the sign (+/−) bit and at least one bit representing the Golomb code of the absolute value of the quantized value. This means that the second embodiment cannot compress one transform coefficient more than two bits.

In the third embodiment, bit information is not directly output to the code output unit, but the bit information lastly output in the second embodiment is further subject to high efficiency encoding to thereby reduce the total code amount. In the following, the third embodiment will be described specifically.

Figure 13:
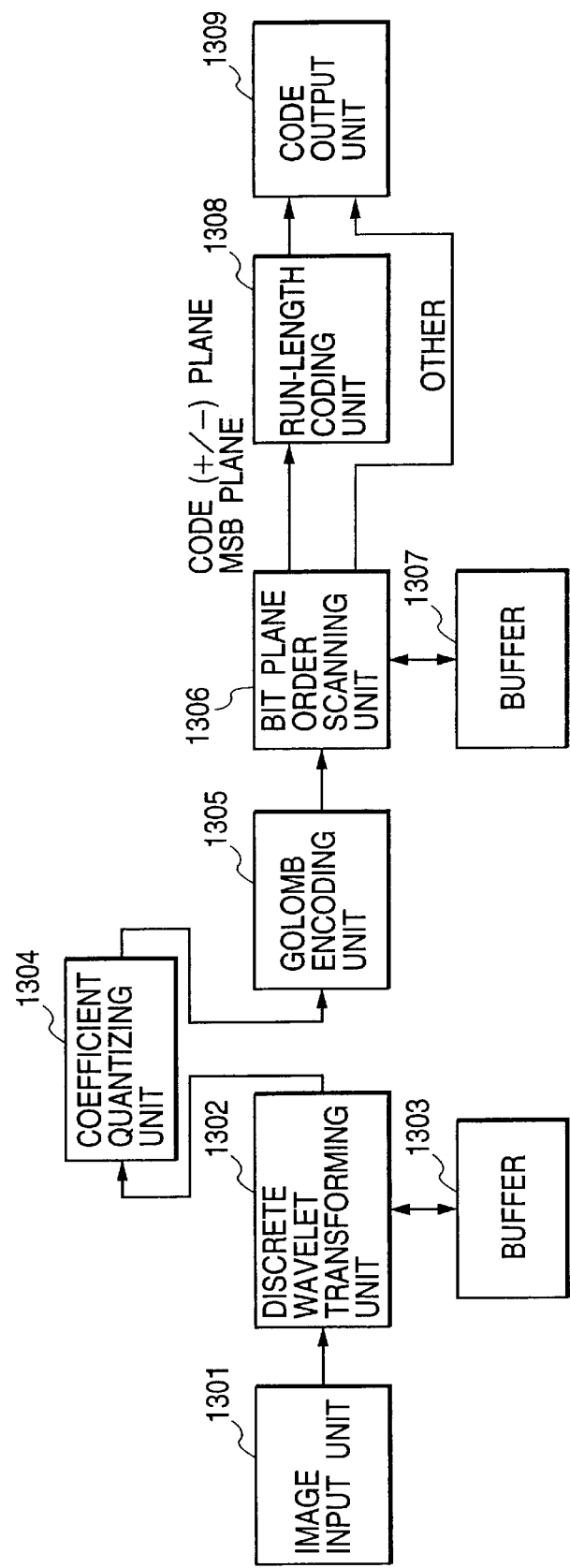
FIG. 13 is a block diagram showing an image processing apparatus according to a third embodiment of the invention.

FIG. 13 is a block diagram of an image processing apparatus according to the third embodiment of the invention. In FIG. 13, reference numeral 1301 represents an image input unit, reference numeral 1302 represents a discrete wavelet transforming unit, reference numeral 1303 represents a buffer, reference numeral 1304 represents a coefficient quantizing unit, reference numeral 1305 represents a Golomb encoding unit, reference numeral 1306 represents a bit plane sequential (order) scanning unit, reference numeral 1307 represents a buffer, reference numeral 1308 represents a run-length encoding unit, and reference numeral 1309 represents a code output unit.

In the description of this embodiment, it is assumed that monochrome image data having eight bits per pixel is encoded. However, the invention is not limited thereto, but is also applicable to encoding a monochrome image having four bits per pixel and a multi-value color image having eight bits per color component of each pixel (RGB/Lab/YCrCb). In encoding multi-value information representative of the state of each pixel or the like constituting an image, the invention is also applicable to, for example, encoding a multi-value index value representative of color of each pixel. When the invention is applied to those cases, multi-value information of various types is encoded by processing it as monochrome image data to be described later.

The image input unit 1301, discrete wavelet transforming unit 1302, buffer 1303, coefficient quantizing unit 1304, Golomb encoding unit 1305, bit plane sequential scanning unit 1306, and buffer 1307 operates in similar manners to the second embodiments, and so the description of these components is omitted.

The bit plane sequential scanning unit 1306 sequentially outputs bit information of each bit plane to the next run-length encoding unit 1308, by using the same data format as that used by the bit plane sequential scanning unit 606 of the second embodiment.

The run-length encoding unit 1308 generates the number of consecutive "1's" of bit information in the sign bit plane and first bit (MSB) plane among the bit information of the bit planes received from the bit plane sequential scanning unit 1306. This consecutive bit number is variable-length encoded by using a correspondence table shown in FIG. 15. FIG. 14 shows an example of bit information output from the bit plane sequential scanning unit 1306, the bit information including some consecutive "1's". Referring to FIG. 14, three consecutive "1's" first appear so that the first consecutive bit number "3" is generated. Then one bit "0" appears which is skipped. Two consecutive bits "1's" appear thereafter so that the second consecutive bit number "2" is generated. Although the next bit "0" is skipped similar to the above, the bit "0" again appears and the bit "1" does not continue so that the third consecutive bit number is "0". Since the two consecutive "0's" can be skipped, paying attention to the next three consecutive "1's", the fourth consecutive bit number "3" is generated. The above consecutive bit numbers are encoded by referring to the correspondence table shown in FIG. 15 to thereby perform the run-length encoding.

Following the above-described run-length encoding, the second and third bit planes are subject to the run-length encoding. Because hierarchical encoding is performed in the unit of bit plane, it is necessary to reset the run-length count at each bit plane.

The code output unit 1309 receives the run-length encoded data output from the run-length encoding unit 1308, as well as additional information supplied from the bit plane sequential scanning unit 1306, and combines them to from final encoded data.

The code output unit 1309 sequentially and hierarchically transmits a plurality set of bit plane data (Golomb encoded and also run-length encoded). The code output unit 1309 may be an interface to a public telephone line, a radio line, a LAN or the like, or a storage device such as a hard disk, a RAM, a ROM, and a DVD.

With the above coding process, an image is transmitted hierarchically in the order from low frequency components to high frequency components, and the reception side can recognize an outline of the image hierarchically. Furthermore, since each bit plane of frequency components is hierarchically transmitted, the reception side can recognize an outline of the image for the frequency components hierarchically. Also, the total code amount can be further reduced because the run-length encoding is additionally performed for each bit plane. Still further, similar to the first embodiment, since each pixel (transform coefficient) is represented by a variable length code, the total code amount can be reduced more than a usual coding for each bit plane.

The encoded data of the embodiment is added when necessary with information necessary for the decoding side such as an image size, the number of bits per pixel, a quantization step for respective frequency components, and encoding parameters k. For example, if an image is processed in the unit of line, block, or band, the image size information is necessary.

(Fourth Embodiment)

In the third embodiment, the run-length encoding is used as a means for highly efficiently encoding bit information of each bit plane. The total code amount may be reduced by using another high efficiency encoding means in place of the run-length encoding. A modification of the third embodiment will be described in the following.

Figure 16:
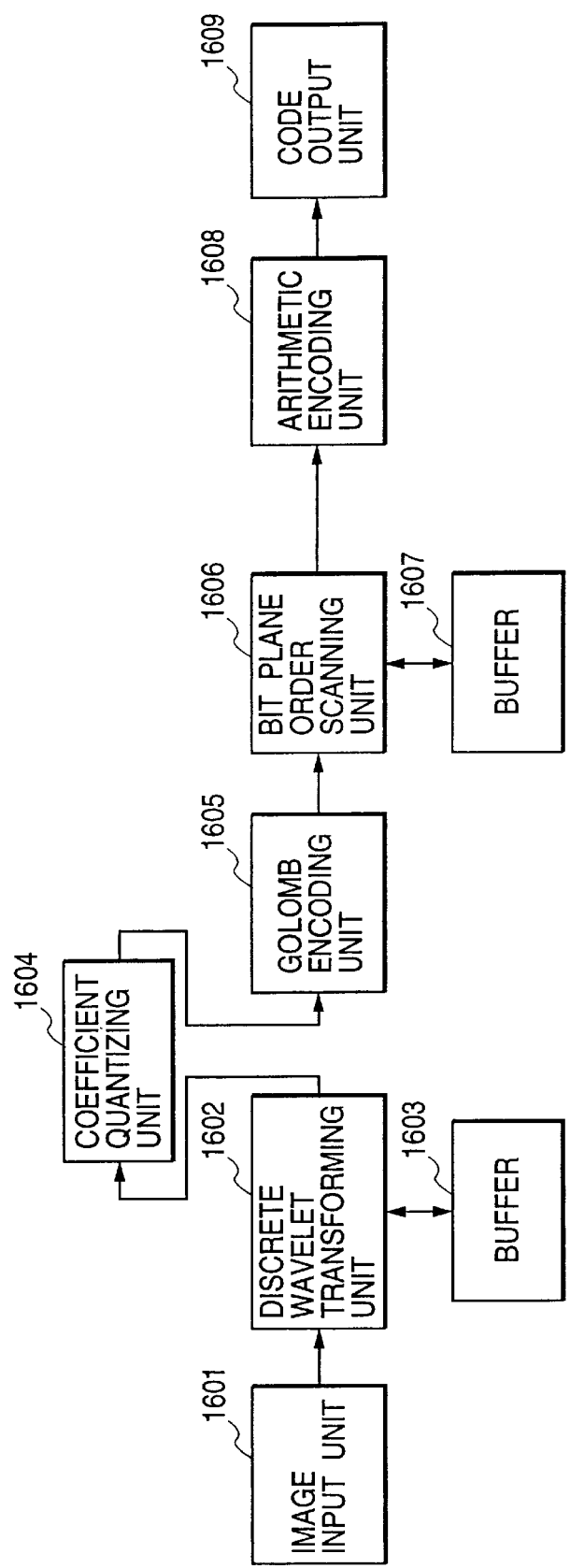
FIG. 16 is a block diagram showing an image processing apparatus according to a fourth embodiment of the invention.

FIG. 16 is a block diagram of an image processing apparatus according to the fourth embodiment of the invention. In FIG. 16, reference numeral 1601 represents an image input unit, reference numeral 1602 represents a discrete wavelet transforming unit, reference numeral 1603 represents a buffer, reference numeral 1604 represents a coefficient quantizing unit, reference numeral 1605 represents a Golomb encoding unit, reference numeral 1606 represents a bit plane sequential (order) scanning unit, reference numeral 1607 represents a buffer, reference numeral 1608 represents an arithmetic encoding unit, and reference numeral 1609 represents a code output unit.

In the description of this embodiment, it is assumed that monochrome image data having eight bits per pixel is encoded. However, the invention is not limited thereto, but is also applicable to encoding a monochrome image having four bits per pixel and a multi-value color image having eight bits per color component of each pixel (RGB/Lab/YCrCb). In encoding multi-value information representative of the state of each pixel or the like constituting an image, the invention is also applicable to, for example, encoding a multi-value index value representative of color of each pixel. When the invention is applied to those cases, multi-value information of various types is encoded by processing it as monochrome image data to be described later.

The image input unit 1601, discrete wavelet transforming unit 1602, buffer 1603, coefficient quantizing unit 1604, Golomb encoding unit 1605, bit plane sequential scanning unit 1606, and buffer 1607 operates in similar manners to the second embodiments, and so the description of these components is omitted.

The bit plane sequential scanning unit 1606 sequentially outputs bit information of each bit plane to the next arithmetic encoding unit 1608, by using the same data format as that used by the bit plane sequential scanning unit 606 of the second embodiment.

The arithmetic encoding unit 1608 encodes the train of bit information output from the bit plane sequential scanning unit 1606 by a QM-coder, by separating the bit information train into 64 parts discriminated by six bits immediately before the target bit. The operation of the QM-corder is described, for example, in ITU-T Recommendation T. 81, ISO/IEC 10918-1 and the like, and so the description thereof is omitted.

After this arithmetic encoding, the second and third bit planes are subject to the arithmetic encoding. Because hierarchical encoding is performed in the unit of bit plane, it is necessary to reset the run-length count at each bit plane.

The code output unit 1609 sequentially and hierarchically transmits a plurality set of bit plane data (subject to Golomb encoding and also arithmetic encoding). The code output unit 1609 may be an interface to a public telephone line, a radio line, a LAN or the like, or a storage device such as a hard disk, a RAM, a ROM, and a DVD.

With the above coding process, an image is transmitted hierarchically in the order from low frequency components to high frequency components, and the reception side can recognize an outline of the image hierarchically. Furthermore, since each bit plane of frequency components is hierarchically transmitted, the reception side can recognize an outline of the image for the frequency components hierarchically. Also, the total code amount can be further reduced because the arithmetic encoding is additionally performed for each bit plane. Still further, similar to the first embodiment, since each pixel (transform coefficient) is represented by a variable length code, the total code amount can be reduced more than a usual coding for each bit plane.

The encoded data of the embodiment is added when necessary with information necessary for the decoding side such as an image size, the number of bits per pixel, a quantization step for respective frequency components, and encoding parameters k. For example, if an image is processed in the unit of line, block, or band, the image size information is necessary.

(Modifications)

The invention is not limited only to the above embodiments.

For example, in the second to fourth embodiments, the discrete wavelet transform is used for encoding. The discrete wavelet transform is not limited only to those used in those embodiments, but the type of filters and a frequency band division method may be changed. Further, in place of the discrete wavelet transform, encoding using other transform methods such as DCT transform (discrete cosine transform) may also be used.

Also the method of quantizing frequency components and variable length encoding are not limited only to the above embodiments. For example, one frequency components set (sub-block) may be further divided into smaller blocks, and the local characteristics of performance of smaller blocks are discriminated to classify them into classes. The quantization step and encoding parameter are finely set for each class.

The configuration of Golomb encoding is not limited only to that used in the above embodiments. In the above embodiments, the Golomb code having an integer V not negative and belonging to the frequency components assigned the encoding parameter k is a combination of m (obtained by shifting V by k-bit right) "0's" followed by "1" (called a variable length part) and the lower k-bit of V (called fixed length part). Instead, the use of "0" and "1" may be reversed to generate the Golomb code. Further, the Golomb code may be either the variable length part followed by the fixed length part or the variable length part followed by the fixed length part.

In the above embodiments, bit planes for the sign (+/−) and transform coefficient (quantized value) are separately output. The invention is not limited only to this. For example, the sign bit plane may not be output, but each sign bit may be output while each bit plane is hierarchically output. More specifically, consider the case wherein the coefficients (quantized values) "3, 4, −2, −5, −4, 0, 1, . . . " shown in FIG. 11 are hierarchically output for each bit plane. In this case, the quantized values other than "0" requires a sign. In this modification, during the output of the first plane, the quantized value having the encoded first bit (MSB) of "0" (corresponding to 4, −5, and −4 in FIG. 11) has a possibility that the original coefficient is "0", so that the sign is not entered. On the other hand, the quantized value having the encoded first bit (MSB) of "0" (corresponding to 4, −5, and −4 in FIG. 11) has no possibility that the original coefficient is "0", so that the signs "1", "0", and "0" for the original coefficients are inserted after the first bit plane and before the second bit plane. Insertion of the sign is performed in a similar manner. Since it is sufficient to enter once the sign for each coefficient, a judgement whether the sign is entered between the second and third bit planes is not performed for the quantized values "4", "−5", and "−4" shown in FIG. 11, but is performed for the quantized values "3", "−2", "0", and "1". Instead of inserting the signs between adjacent bit planes, the signs "1", "0", and "0" for the quantized values "4", "−5", and "−4" may be added after the encoded first bits (MSB) of "1", "1", and "1" thereof to output "1, 1", "1, 0", and "1, 0".

The quantized values having plus and minus signs may be converted once into their integer median without the sign, and this median is variable-length encoded (or Golomb encoded). In this case, the quantized values 0, −1, 1, −2, 2, . . . are converted into medians of 0, 1, 2, 3, 4, . . . .

In the above embodiments, the wavelet transformed transform coefficients (quantized values) are Golomb encoded by setting the encoding parameters k on the assumption that the transform coefficient "0" occurs at the highest occurrence frequency. The invention is not limited only thereto so long as the encoding parameter is set so that the Golomb encoding can be performed efficiently in accordance with the occurrence frequency of each transform coefficient. For example, the occurrence frequency of each transform coefficient to be variable-length encoded may be actually analyzed to set the optimum encoding parameters k allowing more efficient encoding.

Also in the above embodiments, a plurality of bit planes constituting one sub-block are all output hierarchically, and thereafter all the planes of the next sub-block are hierarchically output, during the hierarchical encoding. The hierarchical encoding may be performed by other methods. For example, after a first bit plane constituting the first sub-block is output, the first bit plane constituting the next sub-block may be output. After the first plane for all the sub-blocks are output, the second bit plane constituting the first sub-block is output to follow similar operations as above.

In the third and fourth embodiments, in order to realize higher efficiency encoding of bit information of each bit plane, the run-length encoding and arithmetic encoding are used. The invention is not limited only thereto, but other high efficiency encoding methods may also be used.

According to the embodiments described above, in accordance with the predicted occurrence distribution of each coefficient, the variable-length encoded data is distributed in each bit plane and hierarchically output. Accordingly, it is possible to quickly recognize an outline of an image from a portion of encoded data. It is also possible to provide hierarchical encoding techniques allowing a good compression efficiency.

(Fifth Embodiment)

Next, the fifth embodiment of the invention will be described with reference to the accompanying drawings.

In the description of this embodiment, it is assumed that monochrome image data having eight bits per pixel is encoded. However, the invention is not limited thereto, but is also applicable to encoding a monochrome image having four bits per pixel and a multi-value color image having eight bits per color component of each pixel (RGB/Lab/YCrCb). In encoding multi-value information representative of the state of each pixel or the like constituting an image, the invention is also applicable to, for example, encoding a multi-value index value representative of color of each pixel. When the invention is applied to those cases, multi-value information of various types is encoded by processing it as monochrome image data to be described later. FIG. 1 is a block diagram of an image processing apparatus according to the first embodiment of the invention.

FIG. 17 is a block diagram of an image processing apparatus according to the fifth embodiment of the invention. In FIG. 17, reference numeral 2101 represents an image input unit, reference numeral 2102 represents a discrete wavelet transforming unit, reference numeral 2103 represents a buffer, reference numeral 2104 represents a coefficient quantizing unit, reference numeral 2105 represents an encoding parameter selecting unit, reference numeral 2106 represents a Golomb encoding unit, reference numeral 2107 represents a bit plane sequential (order) scanning unit, reference numeral 2108 represents a buffer, and reference numeral 2109 represents a code output unit.

Image data of an image to be encoded is successively input from the image input unit 2101 in the order of raster scan. The image input unit 2101 may be a scanner, an image pickup device of a digital camera or the like, an image pickup device such as a CCD, an interface to a network, or the like. The image input unit 2101 may also be a storage device such as a RAM, a ROM, a hard disk, and a CD-ROM.

The discrete wavelet transforming unit 2102 temporarily stores image data of one frame input from the image input unit 2101 in the buffer 2103. Next, the image data of one frame stored in the buffer 2103 is subject to known discrete wavelet transform, and is separated into a plurality of frequency bands. In this embodiment, the discrete wavelet transform for an image data train x(n) is performed by the following equations:

$$r(n) = \text{floor}\{(x(2n)+x(2n+1))/2\}$$

$$d(n) = x(2n+2) - x(2n+3) + \text{floor}\{(-r(n)+r(n+2)+2)/4\}$$

where r(n) and d(n) are transform coefficients, r(n) are for low frequency components, and d(n) are for high frequency components. In the above equations, floor $\{X\}$ indicates a maximum integer not larger than X. Although these transform equations are applied to one-dimensional data, two-dimensional transform is possible by performing transform in the horizontal and vertical directions. For example, the pixel data can be divided into four frequency bands (sub-blocks) LL, HL, LH, and HH such as shown in FIG. 18A.

The generated LL components are also subject to the discrete wavelet transform in the similar manner as above, so that the pixel data is divided into seven frequency components (sub-blocks) such as shown in FIG. 18B. In this embodiment, the pixel data is subject once more to the discrete wavelet transform to divide it into ten frequency blocks (sub-blocks) LL, HL3, HH3, HL2, LH2, HH2, HL1, LH1, and HH1 such as shown in FIG. 18C.

The transform coefficients are output to the coefficient quantizing unit 2104 in the order of raster scan, in the unit of sub-block, and in the order of sub-blocks LL, HL3, HH3, HL2, LH2, HH2, HL1, LH1, and HH1.

Figures 19, 20:
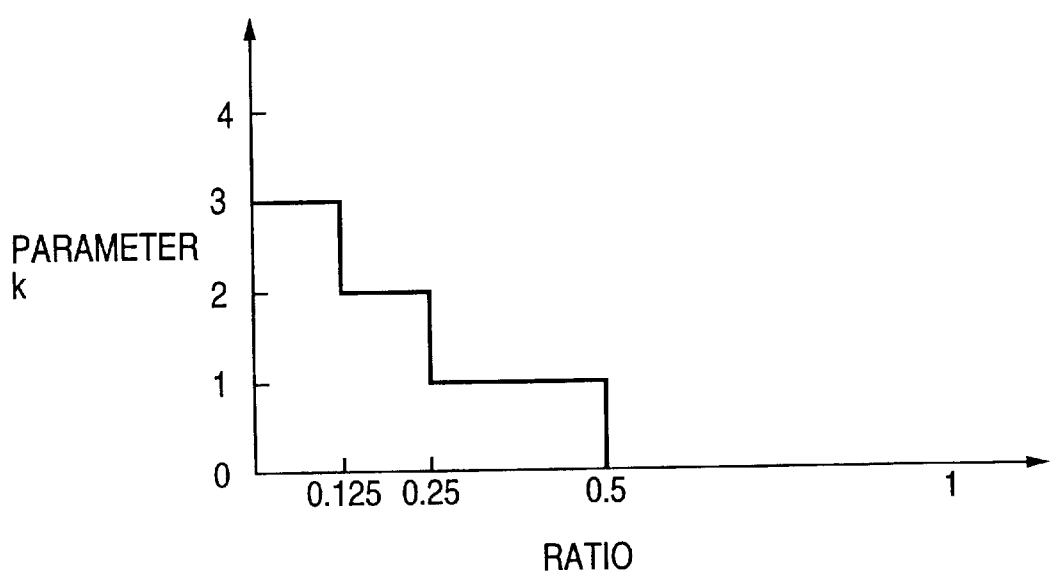
FIG. 19 illustrates quantizing steps.
FIG. 20 is a diagram illustrating a method of determining an encoding parameter.

The coefficient quantizing unit 2104 quantizes each of the wavelet transform coefficients output from the discrete wavelet transforming unit 2102 at a quantizing step determined for each group of the frequency components, and outputs the quantized value to the Golomb encoding unit 2105. The quantized coefficient value Q(X) is given by the following equation, by representing the coefficient value by X and the quantizing step value for the frequency components the coefficient value belongs by q:

$$Q(X) = \text{floor}\{(X/q)+0.5\}$$

where floor $\{X\}$ indicates a maximum integer not larger than X. A correspondence between the frequency components and the quantizing step of this embodiment is shown in FIG. 19. As shown in FIG. 19, the quantizing step is made large for the high frequency components (such as HL1, LH1, and HH1) than for the low frequency components (such as LL).

Generally, an occurrence frequency of each quantized value output from the coefficient quantizing unit 2104 changes with the contents of an image to be encoded. Therefore, in order to make the following Golomb encoding (variable length encoding) efficient, a method of forming a variable length code is required to be changed properly.

In this embodiment, of the Golomb codes shown in FIG. 22 to be later detailed, occurrence frequency distributions of k kinds are anticipated, the occurrence frequency distribution being representative of a degree of reducing the occurrence frequency from the highest occurrence frequency code (in the example shown in FIG. 22, Golomb code "1", "10", or "100" corresponding to the quantized value "0") toward the lower occurrence frequency code (in the example shown in FIG. 22, Golomb code corresponding to a very large quantized value). In order to generate variable length codes (Golomb codes) corresponding to the occurrence frequency distributions of k kinds, the encoding parameter k is selected. It is defined that the Golomb encoding parameter k is 0 if a shift to the highest occurrence frequency of a quantized value is largest, and as the shift becomes smaller, the encoding parameter increases to 1, 2 . . . .

More specifically, the encoding parameter selecting unit 2108 shown in FIG. 17 selects the encoding parameter k in accordance with an input quantized value. The encoding parameter selecting unit 2105 counts the number of quantized values "0" of each sub-block contained in the quantized values input from the coefficient quantizing unit 2104, and calculates a ratio R of the number of quantized values "0" to the number of all quantized values of the sub-block.

Next, in accordance with the calculated ratio R, the encoding parameter selecting unit 2105 selects the Golomb encoding parameter k in the manner illustrated in FIG. 20. For example, if the ratio R is 0.5 or higher, it means that the number of quantized values "0" with the highest occurrence frequency is very large. In this case, "0" is selected as the optimum encoding parameter. If the ratio R is in a range from 0.25 inclusive to 0.5 exclusive, "1" is selected as the optimum encoding parameter k. Similarly, as the ratio R becomes smaller, a large value is selected as the optimum encoding parameter k.

A natural image suitable for encoding of this embodiment has generally a tendency that the transform coefficients for the high frequency components (e.g., HH1) has a larger reduction degree from the highest occurrence frequency quantized value toward the lower occurrence frequency larger quantized value than the transform coefficients for the low frequency components (e.g., HH3), i.e., a larger shift to the highest occurrence frequency quantized value. Also in this embodiment, since the transform coefficients for the high frequency components are quantized more roughly than those for the low frequency components, the reduction degree from the highest occurrence frequency quantized value toward the lower occurrence frequency larger quantized value becomes much larger for the transform coefficients for the high frequency components than the transform coefficients for the low frequency components. In this embodiment, the above-described two parameters are taken into consideration in setting the encoding parameter k.

As described above, if the encoding parameter k is set smaller to Golomb encode a plurality of quantized values, these values can be encoded efficiently if the reduction degree from the highest occurrence frequency quantized value toward the lower occurrence frequency larger quantized value is large. On the other hand, if the encoding parameter k is set larger to Golomb encode a plurality of quantized values, these values can be encoded efficiently if the reduction degree from the highest occurrence frequency quantized value toward the lower occurrence frequency larger quantized value is small. A correspondence between the frequency components and encoding parameters k of this embodiment used by the encoding parameter selecting unit 2105 is shown in FIG. 21.

Since the fundamental method of the Golomb encoding to be executed by the Golomb encoding unit 2106 is well known, only the fundamental operation of encoding and features of the invention will be briefly described.

The Golomb encoding unit 2106 checks the sign (plus/minus) of each of sequentially inputted quantized values, and outputs a sign (+/−) bit. Specifically, if the quantized value is 0 or plus, a sign bit of "1" is output, whereas if it is minus, a sign bit of "0" is output.

Next, the absolute value of the quantized value is subject to Golomb encoding. Each quantized value having an absolute value V and belonging to the frequency components set with the encoding parameter k is Golomb encoded in the following manner. First, V is shifted right by k-bit, and its integer value m is calculated. The Golomb code of V is a combination of m "0's" followed by "1" and the lower k-bit of V. Examples of Golomb bits for k=0, 1, and 2 are shown in FIG. 22. As seen from FIG. 22, the length of the Golomb code corresponding to the quantized value "0" is much shorter at the parameter k=0 than at the parameters k=1, 2. Therefore, the encoding efficiency is improved when a plurality of quantized values having a large ratio R of the quantized value "0" is encoded.

In the Golomb coding, encoding and decoding can be performed without using a code list. While the variable length codes are checked sequentially and hierarchically from the upper bits, the range of decoded values for the following lower bits can be sequentially limited. Therefore, when these variable length codes are hierarchically output for each bit plane, the reception side can recognize the outline of a decoded image quickly and efficiently.

The sign (+/−) and Golomb encoded data of each input quantized value generated as above are output to the bit plane sequential scanning unit 2107.

The bit plane sequential scanning unit 2107 processes on the frequency components (sub-block) unit basis. The encoded data of one set of frequency components (one sub-block of LL to HH1) generated by the Golomb encoding unit 2106 is stored in the buffer 2108. The sign (+/−) bit of each pixel generated by the Golomb encoding unit 2106 is stored in a sign bit plane, and the start bit (MSB) of the Golomb code of each pixel is stored in a first bit plane, and the second bit is stored in a second bit plane. Similarly, the third and following bits are sequentially stored in third and following bit planes. In the above manner, the encoded data of each pixel is stored in the buffer 2108 as a plurality of bit planes.

For example, if the code output from the Golomb encoding unit 2106 is "0110", "0" is stored in the sign bit plane, "1" is stored in the first bit plane, "1" is stored in the second bit plane, and "0" is stored in the third bit plane. In the case of this data "0110", bit information is not stored in the fourth bit plane.

Figures 23, 24:
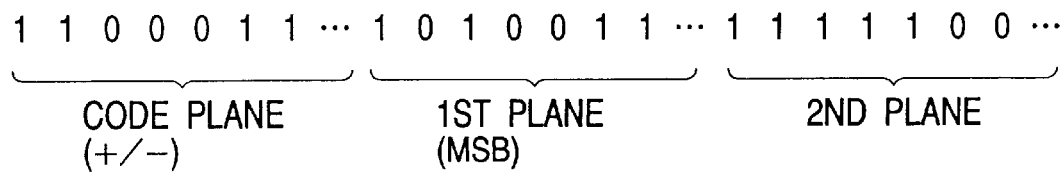
FIG. 23 is a diagram showing a bit plane structure.
FIG. 24 shows encoded data output from a bit plane sequential scanning unit 2107.

FIG. 23 shows a data series "3, 4, −2, −5, −4, 0, 1, . . . " of coefficients (quantized values) of HL3 frequency components encoded by the Golomb encoding unit 2106 and stored in bit planes. The hatched blanks shown in FIG. 23 have no bit information stored therein because the encoded data was terminated at their upper level planes. The bit plane sequential scanning unit 2107 receives encoded data of one set of frequency components (one sub-block of LL to HH1) from the Golomb encoding unit 2106 and stores it in the butter 2108. Thereafter, it reads information from each bit in the order of raster scan, from the sign bit plane, first bit plane, second bit plane, . . . , i.e., after the sign bit plane from the upper to lower bit planes, and outputs it to the code output unit 2108. FIG. 24 shows the data format of the bit information stored in the buffer 2108 and sequentially output in the order of bit plane.

The hierarchical output of the bit planes is performed in the order from the low frequency components sub-block LL, to HL3, LH3, HH3, HL2, LH2, HH2, HL1, LH1, and to HH1.

The code output unit 2109 sequentially and hierarchically transmits a plurality set of bit plane data. The code output unit 2109 may be an interface to a public telephone line, a radio line, a LAN or the like, or a storage device such as a hard disk, a RAM, a ROM, and a DVD.

With the above coding process, an image is transmitted hierarchically in the order from low frequency components to high frequency components, and the reception side can recognize an outline of the image hierarchically. Furthermore, since each bit plane of frequency components is hierarchically transmitted, the reception side can recognize an outline of the image for the frequency components hierarchically. Still further, since each pixel (transform coefficient) is represented by a variable length code, the total code amount can be reduced more than a usual coding for each bit plane.

The encoded data of the embodiment is added when necessary with information necessary for the decoding side such as an image size, the number of bits per pixel, a quantization step for respective frequency components, and encoding parameters k. For example, if an image is processed in the unit of line, block, or band, the image size information is necessary.

(Sixth Embodiment)

In the fifth embodiment, the encoding parameter k is anticipated by using the ratio of the number of quantized values "0". The optimum parameter k may be selected by other methods. In the sixth embodiment, the encoding parameter k is obtained based upon the statistical distribution of quantized values. The whole structure of the encoding apparatus of this embodiment is the same as the fifth embodiment, and only the operation of the encoding parameter selecting unit 2105 shown in FIG. 17 is different.

Similar to the fifth embodiment, image data is input from the image input unit 2101 and temporarily stored in the buffer 2103. The image data is thereafter subject to two-dimensional discrete wavelet transform by the discrete wavelet transforming unit 2102 to be divided into a plurality of frequency bands (sub-blocks) such as shown in FIG. 18. The transform coefficient for each sub-block is quantized at a predetermined quantizing step q by the coefficient quantizing unit 2104, and input to the encoding parameter selecting unit 2105.

Figure 25A:
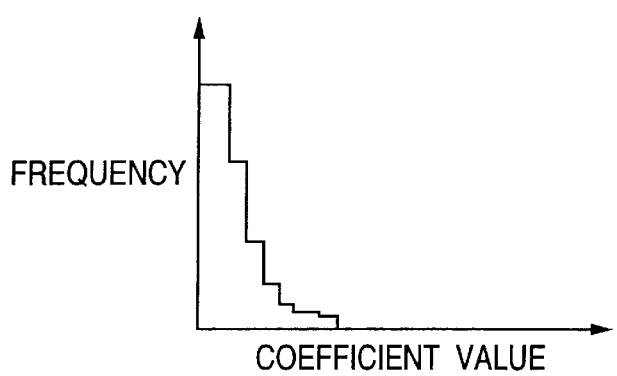
FIGS. 25A and 25B are diagrams illustrating a method of determining an encoding parameter according to a sixth embodiment.

The operation of the encoding parameter selecting unit 2105 of this embodiment will be described with reference to FIGS. 25A and 25B.

The encoding parameter selecting unit 2105 forms a histogram of input quantized values of each sub-block. FIG. 25A shows an example of the histogram formed by the encoding parameter selecting unit 2105. This histogram shown in FIG. 25A is a histogram of coefficient values (quantized values) constituting a sub-block for high frequency bands such as HL3 and LH3, wherein there is a large peak at the coefficient value (quantized value) "0" and the occurrence frequency lowers steeply. Next, in accordance with the histogram, the encoding parameter selecting unit 2105 selects the encoding parameter k in the manner illustrated in the flow chart shown in FIG. 25B.

Figure 25B:
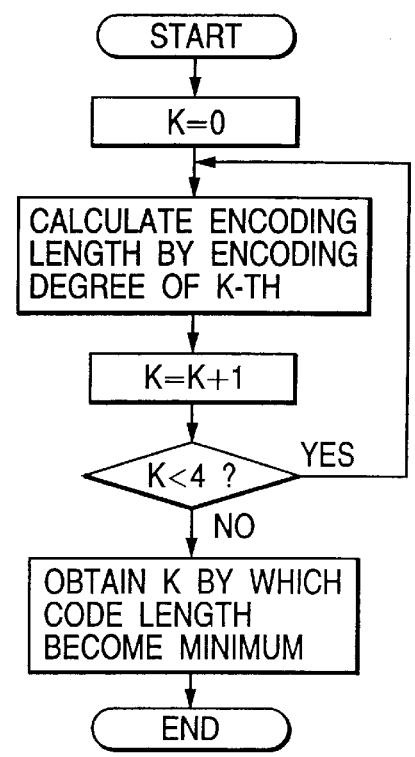

Referring to FIG. 25B, as an initial value of a candidate value K(i) for the encoding parameter k, 0 is first selected. By using this K(i) and the histogram, the length L(i) of each code is calculated from the following equation:

$$q \leq Q_{max}$$
$$L(i) = \Sigma(((q>>K(i))+1+K(i))*H(q))$$
$$q=0$$

where q is a quantized value, Qmax is a predetermined maximum quantized value, H(q) is the number of occurrence frequencies of the quantized value q obtained from the histogram, >>is a right shift operator, and q>>K(i) means that q is shifted right by K(i) bits. Next, the encoding parameter selecting unit 2105 increments K(i) by 1. If the incremented value is a predetermined value (in this embodiment, "4"), the code length L(i) is again calculated from the above equation using the current candidate K(i). If the incremented value is 4 or larger, the encoding parameter selecting unit 2105 selects the candidate value K(i) corresponding to the minimum value of the stored L(i), and outputs it as the encoding parameter k.

The processes to follow are similar to the fifth embodiments, and so the description thereof is omitted. In the above manner, since the encoding parameter k is selected which provides the shortest code length of each sub-block, an image can be compressed and encoded at a high efficiency.

(Seventh Embodiment)

In the sixth embodiment, the encoding parameter k is selected by using the histogram of quantized values. However, it is necessary to read all data in each sub-block in order to form the histogram. In the seventh embodiment, without using the histogram, a method of using the maximum value of quantized values in each sub-block will be described.

Similar to the sixth embodiment, the configuration of the seventh embodiment is the same as the fifth embodiment excepting the encoding parameter selecting unit 2105, and to the description thereof is omitted. In the seventh embodiment, the encoding parameter selecting unit 2105 obtains a maximum value of quantized values in the sub-block supplied from the coefficient quantizing unit 2104. The encoding parameter selecting unit 2105 selects an optimum encoding parameter k corresponding to the maximum value, by referring to a relation between the maximum value and the optimum encoding parameter k determined in advance by a predetermined method.

Figure 26:
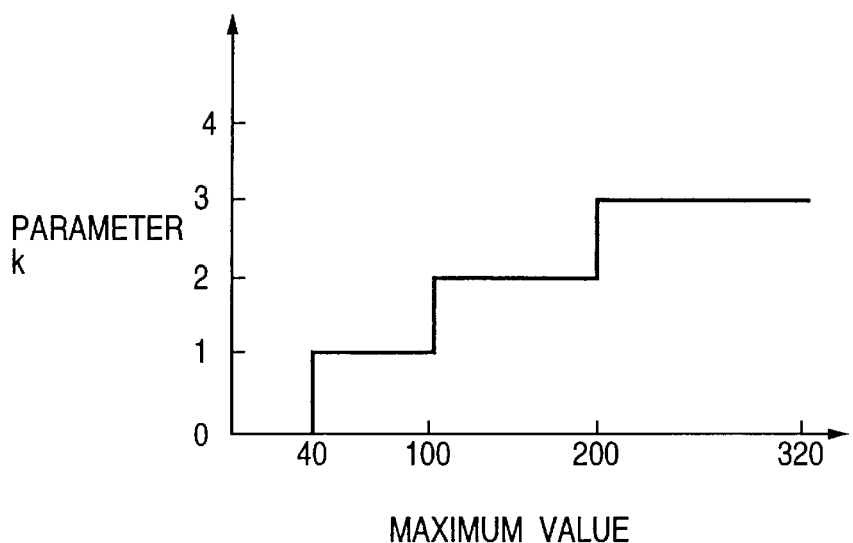
FIG. 26 is a diagram illustrating a method of determining an encoding parameter according to a seventh embodiment.

FIG. 26 shows an example of the relation between the maximum value and the optimum encoding parameter k. In this example, if the maximum quantized value in the sub-block is in a range from 0 inclusive to 40 exclusive, the encoding parameter of "0" is selected, and it is in a range from 40 inclusive to 100 exclusive, the encoding parameter of "1" is selected. This table may be stored as a look-up table or the like.

Generally, the coefficient value or quantized value obtained through discrete wavelet transform of an image has a distribution similar to a Laplace distribution. Therefore, by checking the relation between the maximum quantized value and an optimum encoding parameter k of several sample images, it is possible to estimate the encoding parameter k from the maximum quantized value.

The encoded data of the embodiment is added when necessary with information necessary for the decoding side such as an image size, the number of bits per pixel, a quantization step for respective frequency components, and encoding parameters k. For example, if an image is processed in the unit of line, block, or band, the image size information is necessary. The encoded data generated by each of the above embodiments.

(Eighth Embodiment)

Another specific method of selecting the Golomb encoding parameter k by the encoding parameter selecting unit 2105 shown in FIG. 17 will be described.

The encoding parameter selecting unit 2105 shown in FIG. 17 obtains an accumulated value A of absolute values of the quantized values input from the coefficient quantizing unit 2104, and selects the Golomb encoding parameter k corresponding to the accumulated value A, by referring to a table shown in FIG. 27 where N is the number of input quantized values. For example, if the value A is in a range from 1.57706N to 3.88106 exclusive, the encoding parameter k of "1" is selected.

Each range shown in the table is predetermined from a correspondence between: a Laplace distribution with a predetermined spread which distribution the quantized value distribution matches; and an encoding parameter which makes the length of the Golomb code encoded from the absolute value of each quantized value. In this embodiment, this correspondence is stored in the encoding parameter selecting unit 2105 as a look-up table.

(Ninth Embodiment)

If the encoding parameter k is selected in accordance with the accumulate value of absolute values of the quantized values as in the eighth embodiment, it is possible to select this encoding parameter k more quickly and easily. In the ninth embodiment, a method of selecting an optimum encoding parameter k through integer arithmetic.

FIG. 28 shows a table indicating a relation between the accumulated value A of absolute values of the quantized values to the encoding parameter k, similar to the table of the eighth embodiment. In this table, the range used for selecting the encoding parameter k is determined so that the range can be calculated using a value raised to a power of "2", excepting the range for k=0.

A procedure of estimating the encoding parameter k by using the table shown in FIG. 28 is expressed by C languages shown in FIG. 29. With this procedure, the encoding parameter k can be calculated without using real number arithmetic. Namely, it is checked at the first row in FIG. 29 whether A is 1.5 N or smaller. If smaller, the encoding parameter k of "0" is selected, whereas it not, the range of A is sequentially checked at the third row and following rows to thereby estimate the encoding parameter k.

With this method, the encoding parameter k can be estimated by using only a bit shift operation without using read number arithmetic. The calculation is therefore easy and quick.

(Modifications)

In the fourth to ninth embodiments, bit information of each bit plane is output directly. The invention is not limited only to the above embodiments. For example, without directly outputting the bit information to the code output unit, the final output bit information of the fifth embodiment may be further subject to high efficiency encoding to thereby reduce the total code amount. The run-length encoding, arithmetic encoding or the like may be used as the high efficiency encoding. In this case, compression can be achieved with a much higher efficiency. Also in the fourth to ninth embodiments, an input image is encoded through discrete wavelet transform. The discrete wavelet transform is not limited only to those used in the embodiments, but the type of filters and a frequency band division method may be changed. Further, in place of the discrete wavelet transform, encoding using other transform methods such as DCT transform (discrete cosine transform) may also be used.

Also the method of quantizing frequency components and variable length encoding are not limited only to the above embodiments. For example, one frequency components set (sub-block) may be further divided into smaller blocks, and the local characteristics of performance of smaller blocks are discriminated to classify them into classes. The quantization step and encoding parameter are finely set for each class.

As described above, according to the fourth to ninth embodiments, a plurality of coefficients are variable-length encoded by selecting a parameter most suitable for the distribution of the coefficients, and the variable-length encoded data is distributed into bit planes to be hierarchically. It is therefore possible to quickly recognize the outline of an image from a fraction of encoded data. It is also possible to provide hierarchical encoding techniques allowing a good compression efficiency.

(Tenth Embodiment)

Figure 30:
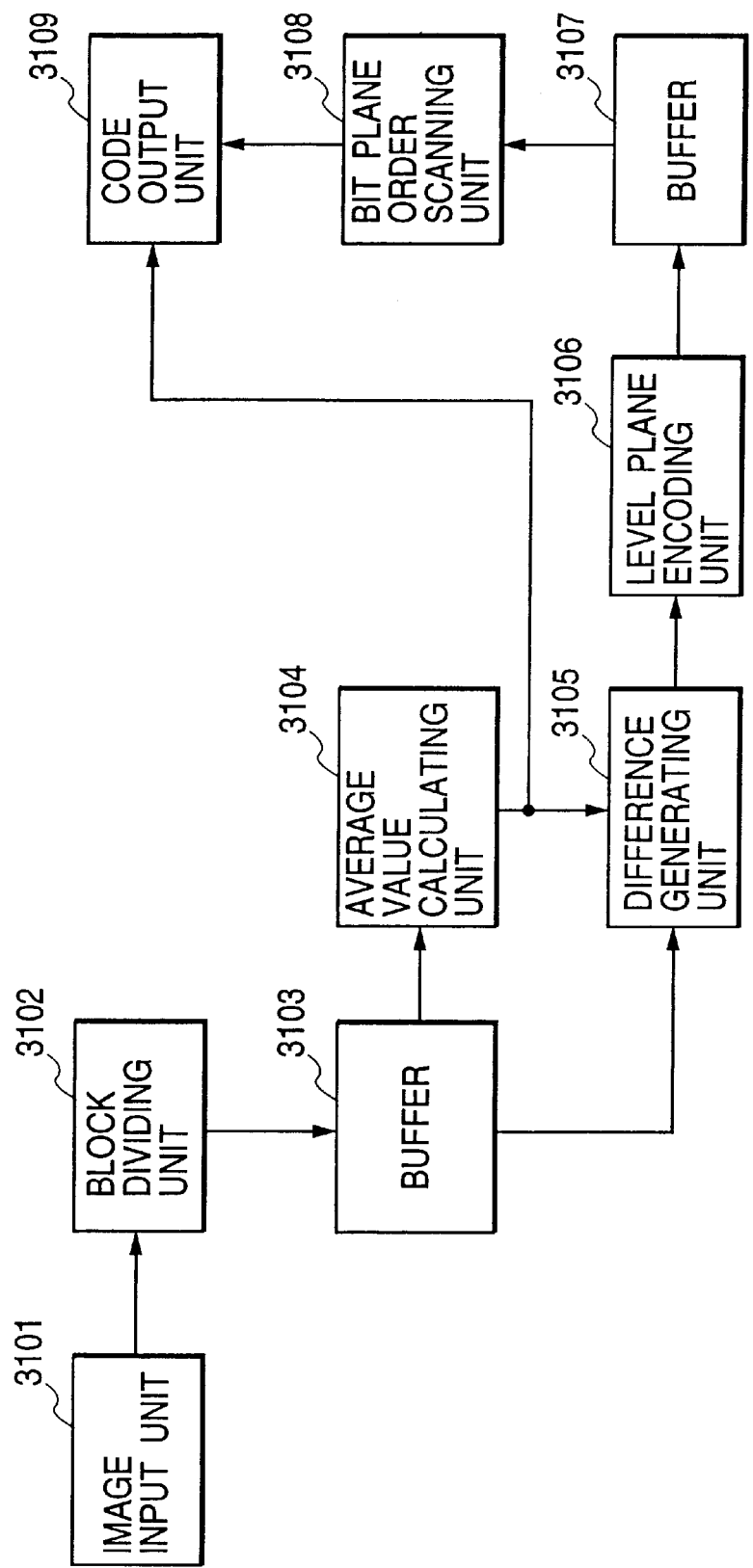
FIG. 30 is a block diagram showing an image processing apparatus according to a tenth embodiment of the invention.

FIG. 30 is a block diagram of an image processing apparatus according to the tenth embodiment of the invention.

In FIG. 30, reference numeral 3101 represents an image input unit, reference numeral 3102 represents a block dividing unit, reference numeral 3103 represents a buffer, reference numeral 3104 represents an average value calculating unit, reference numeral 3105 represents a difference generating unit, reference numeral 3106 represents a level plane encoding unit, reference numeral 3107 represents a buffer, reference numeral 3108 represents a bit plane sequential (order) scanning unit, and reference numeral 3109 represents a code output unit.

In the description of this embodiment, it is assumed that monochrome image data having four bits per pixel is encoded. However, the invention is not limited thereto, but is also applicable to encoding a monochrome image having eight bits per pixel and a multi-value color image having eight bits per color component of each pixel (RGB/Lab/YCrCb). In encoding multi-value information representative of the state of each pixel or the like constituting an image, the invention is also applicable to, for example, encoding a multi-value index value representative of color of each pixel. When the invention is applied to those cases, multi-value information of various types is encoded by processing it as monochrome image data to be described later.

The operation of each unit of the embodiment will be described in detail.

Image data (pixel data) of an image to be encoded is successively input from the image input unit 3101 in the order of raster scan. The image input unit 3101 may be a scanner, an image pickup device of a digital camera or the like, an image pickup device such as a CCD, an interface to a network, or the like. The image input unit 3101 may also be a storage device such as a RAM, a ROM, a hard disk, and a CD-ROM.

Figures 31, 32:
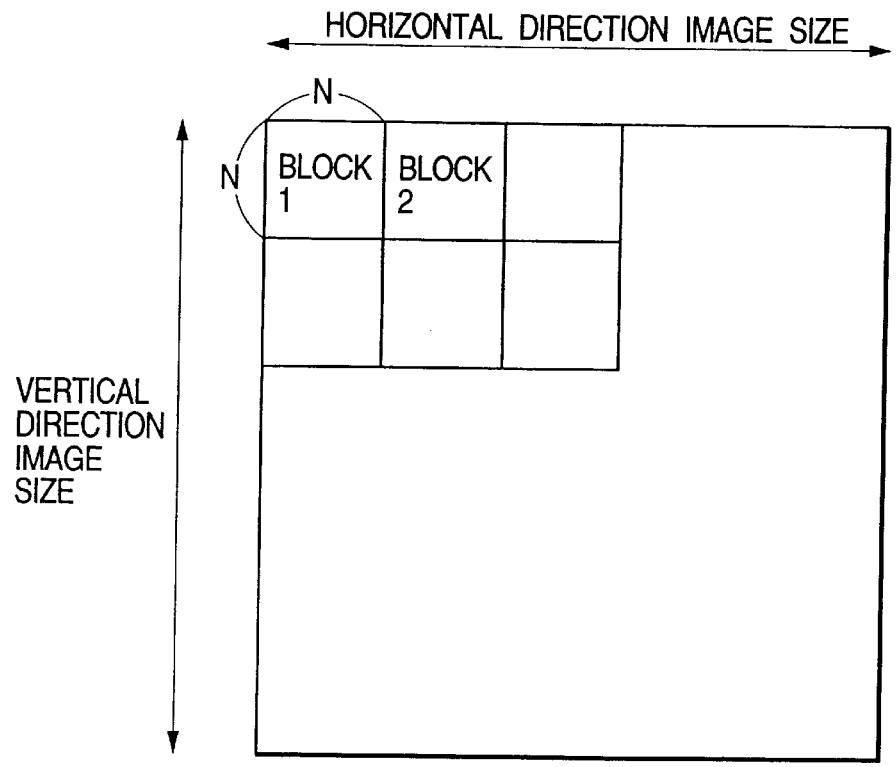
FIG. 31 is a diagram illustrating block division.
FIG. 32 is a diagram showing codes used by a level plane encoding unit.

The block dividing unit 3102 has a buffer for storing image data of N lines supplied from the image input unit 3101. After the image data of N lines is stored, the block dividing unit 3102 divides the image data into square blocks each having N×N pixels such as shown in FIG. 31, and reads pixel values of each block and stores them in the buffer 3103.

The average value calculating unit 3104 calculates an average value of N×N pixels constituting each block stored in the buffer 3103. The value smaller than the decimal point of the average value of each block is changed into an integer through half-adjust.

The difference generating unit 3105 calculates and outputs a difference D between each pixel value constituting the block stored in the buffer 3103 and the average value of the block output from the average value calculating unit 3104.

The level plane encoding unit 3106 encodes the difference D generated by the difference generating unit 3105, after separating the difference into a sign representative of plus or minus and an absolute value of the difference, the encoded data being supplied to the buffer 3107. The sign representative of plus and minus is represented by "0" for plus and "1" for minus.

FIG. 32 shows an example of codes of the absolute values of differences D. Each code shown in FIG. 32 is constituted of a predetermined number of "0's" determined by the absolute value of a difference, followed by "1" indicating the end of the code. For example, an absolute value "4" is assigned a code "00001" constituted of four O's followed by "1". These codes are generated based upon a general occurrence frequency distribution which is assumed to be such a distribution that as the absolute value increases by 1, the occurrence frequency probability is halved, such as a probability of 0.5 for the absolute value "0" and a probability of 0.25 for the absolute value "1". These codes can be generated easily from the absolute value of each difference to be encoded. These codes are therefore efficient because a code list such as shown in FIG. 32 is not required to be stored in a memory. In this embodiment, each difference D is encoded always in accordance with the rule such as shown in the table of FIG. 32. The invention is not limited only thereto. For example, the rule such as shown in the code list may be changed for each or a plurality of blocks to be encoded, in accordance with the actually discriminated contents (e.g., occurrence frequency of the difference D in each or a plurality of blocks to be encoded) of an image to be encoded, or with other parameters.

The contents of the code list of this embodiment shown in FIG. 32 for each bit plane are intended to be transmitted to the reception side. More specifically, each time the reception side receives one bit of a variable length code shown in FIG. 32, the candidates values of the difference D as the decoded values are limited to consecutive values. For example, when the reception side receives first an MSB (highest level bit) of a variable length code, the reception side can conclude that the decoded value (difference D) of the variable length code is either "0" or any one of values equal to or larger than "1", depending upon whether the MSB is "0" or "1". When the reception side receives the second bit, the reception side can conclude that the decoded value (difference D) of the variable length code is either "0", "1", or any one of values equal to or larger than "2", depending upon whether the second bit is "0" or "1".

This code list can be realized by forming code trees through combination of only two adjacent pixel values in the process of forming a code tree by repetitively combining two pixel values of low occurrence frequencies in the algorithm of Huffman coding.

With the assignment of variable length codes described above, in hierarchically decoding encoded data output for each bit plane, a range of decoded values (difference D) matching the occurrence frequency probability thereof can be limited most efficiently. Specifically, in decoding encoded data output for each bit plane, when the first bit (MSB) of the variable length code is received as a bit plane, it can be recognized at the time when MSB is received that each pixel has a larger value (1 or larger in FIG. 32) or smaller value (0 in FIG. 32) than the threshold value (a value between 0 and 1 in FIG. 32) of a decoded value having a large occurrence frequency. Therefore, the outline of the image can be known at this time most efficiently. When the second bit of the variable length code is received as a bit plane, it can be recognized at the time when the second bit is received that each pixel (pixel not having a difference D of 0) has a larger value (2 or larger in FIG. 32) or smaller value (1 in FIG. 32) than the threshold value (a value between 0 and 1 in FIG. 32) of a decoded value having a large occurrence frequency. Therefore, the outline of the image can be known at this time most efficiently. Since the above processes are sequentially performed, the outline of the image can be recognized at the earlier stage. In contrast, conventional hierarchical encoding and decoding do not consider such a role of the bit plane. Namely, with conventional hierarchical bit plane encoding and decoding, a value (difference D in this embodiment) represented by multi-value of a fixed bit length is encoded for each bit plane and output hierarchically. Therefore, it can be recognized from the bit plane corresponding to the first bit (MSB) only that the value (difference D) is either higher or lower than the median (a value between 127 and 128 if $0 \leq D \leq 255$). If the values (differences D) are concentrated upon a lower or higher range, there is a high possibility that the decoded value is very different from the correct decoded value, and it is difficult to know the outline of the image at an earlier stage. The embodiment encoding method is far more effective than the conventional method described above.

The code train generated by the level plane encoding unit 3106 is stored in the buffer 3107 in the following manner. A sign (+/−) bit corresponding to each difference value is stored in a sign bit plane of the buffer 3107 as binary data. The highest level bit (MSB) of the variable length code corresponding to the absolute value of each difference value is stored in a first code plane of the buffer 3107 as binary data, the next second bit is stored in a second bit plane as binary data. The position of the binary data in each bit plane is controlled so as to make it correspond to the position of the pixel (difference D) of the original image encoded. Similarly, each bit constituting the variable length encoded data is stored in the buffer 3107 as binary data of the third bit plane, fourth bit plane, . . . , in the order of higher bit.

As will be later described, since the encoded data stored in the buffer 3107 is variable-length encoded, whether bits constituting the encoded data are stored up to which bit plane is different for each pixel.

For example, if the difference D of a pixel is −2, the sign (plus/minus) bit output from the level plane encoding unit 3106 is "1", and the variable length encoded data for the absolute value is "001". Therefore, the sign bit "1" is stored in the sign bit plane, the first bit "0" of the variable length code is stored in the first bit plane, the second bit "0" is stored in the second bit plane, the last bit "1" is stored in the third bit plane, and data is not stored in the fourth and following bit planes. If the difference D is 5, i.e., if the variable length code output from the level plane encoding unit 3106 is "000001", data is stored down to the sixth bit plane.

FIG. 33 shows bit planes storing a series of differences D "−1, 2, 0, 1, −2, −3, −7, 4, . . . " encoded by the level plane encoding unit 3106.

Symbols x and Δ in FIG. 33 indicate that no bit information is stored because the variable length code is terminated at the upper level bit plane. If the difference D is 0, the sign bit is not necessary. As shown, variable length encoding is executed before they are stored in bit planes so that the total code length can be shortened more than the difference is expressed by fixed length multi-value.

After the encoded data of one block (N×N pixels) is stored in the buffer 3107, the bit plane sequential scanning unit 3108 reads from the buffer 3107 bit information "1/0" of each plane in the order of raster scan, from the first bit plane (MSB), second bit plane, . . . , and outputs it to the code output unit 3109.

In this embodiment, the bit planes to be output are the limited bit planes 1' to 4' of variable length codes. Specifically, the bit planes 1' to 3' are generated in accordance with the first to third bit planes and the sign bit plane stored in the buffer 3107, and the bit plane 4' contains all bits in the fourth and following bit planes.

FIG. 34 shows the variable length encoded data (bit information) of each bit plane hierarchically read from the contents of the buffer 3107 shown in FIG. 33.

In generating the bit plane 1' shown in FIG. 34, MSB (first bit) of the variable length code shown in FIG. 33 and corresponding to each difference D is sequentially output.

The data in the sign bit plane shown in FIG. 33 is not output as an independent bit plane, but it is added to the end of the bit plane 1'. Specifically, if the first bit of the variable length code corresponding to each difference D is not "0", the sign bit is necessary, and the data in the sign bit plane is added to the end of the bit plane 1'. The sign bits shown in FIG. 33 is therefore "1001110, . . . ".

In generating the second bit plane 2', the second bits "1" and "0" of the variable length codes corresponding to the differences D of "−1" and "2" are output. After it is confirmed that the second bit of the variable length code corresponding to the difference D of "0" is not present (blank), the second bit "1" of the variable length code corresponding to the difference D of "1" is output. Similar operations are repeated for the following differences D of "−2", "−3", "−7", and "4".

In generating the third bit plane 3', after it is confirmed that the third bit of the variable length code corresponding to the difference D of "−1" is not present (blank), the third bit "1" of the variable length code corresponding to the next difference D of "2" is output. Further, after it is confirmed that the third bits of the variable length code corresponding to the next differences D of "0" and "1" are not present (blank), the third bit "1" of the variable length code corresponding to the next difference D of "−" is output. Similar operations are repeated for the following differences D of "−3", "−7", and "4".

In this embodiment, if it is confirmed that the bit of the variable code corresponding to a difference D is blank (indicated by x or Δ), as in the cases of generating the bit planes 2' and 3', the bit in the blank (indicated by x or Δ) is not output but skipped to follow confirming the bit of the variable length code corresponding to the next difference D.

Since the variable length encoding is performed before the encoded data is stored in bit planes, the number of blanks (indicated by x or Δ) increases more at the lower bit plane. Therefore, the number of processes of confirming the blank (indicated by x or Δ) becomes larger at the lower bit plane. In this embodiment, in order to reduce the number of such confirmation processes, the bit plane 4' is generated in the following manner to thereby speed up the encoding process.

In generating the bit plane 4', after it is confirmed that the fourth bits of the variable length codes corresponding to the differences D of "−1", "2", "0", the fourth bit "1" of the variable length code corresponding to the next difference D of "−3" is output, and further the fourth bit "0" of the variable length code corresponding to the next difference D of "−7" is output. Since the bit plane 4' is the last bit plane, the fifth bit "0" for the difference D of "−7" is output. Therefore, the bit for the bit plane 4' for the difference D of "−7" is not one bit, but includes a plurality of bits of "00001". Similarly, the bits "01" for the difference of "4" are output.

As seen from FIG. 33, the variable length code corresponding to the difference D of "−7" has eight bits. If the fourth, fifth, and following bit planes 4', 5', . . . are generated by the same method as that of generating the first to third bit planes 1' to 3', all the blanks indicated by x and Δ shown in FIG. 33 are required to be checked. In contrast, in the embodiment, since the bit plane 4' (last bit plane) is generated, high speed encoding is possible because only the blank indicated by x shown in FIG. 33 is confirmed.

When the reception side received the data shown in FIG. 34 read from the buffer 107 and output from the code output unit 3109, the reception side can know the positions of the blanks shown in FIG. 33 because the reception side knows that the data was sequentially output in the order from upper level bit plane.

The code output unit 3109 adds the average value of each block obtained by the average value calculating unit 3104 to the top of the encoding data of each bit plane shown in FIG. 34, and stores it in the internal memory or transmits it to an external apparatus. The code output unit 3109 may be a storage medium such as a hard disk, a RAM, a ROM, and a DVD, or an interface to a public telephone line, a radio line, a LAN or the like.

With the above encoding process, the reception side can grasp the outline of an image at an earlier state even if the data is transmitted hierarchically in the order of upper level bit plane. Further, the total code amount can be reduced more than that each pixel represented by fixed length multi-value is output for each bit plane.

The encoding data generated in this embodiment is added when necessary with information such as an image size, a block size, and a code amount of each block.

(Eleventh Embodiment)

Next, the eleventh embodiment of the invention will be described with reference to the accompanying drawings.

In the description of this embodiment, it is assumed that monochrome image data having eight bits per pixel is encoded. However, the invention is not limited thereto, but is also applicable to encoding a monochrome image having four bits per pixel and a multi-value color image having eight bits per color component of each pixel (RGB/Lab/YCrCb). In encoding multi-value information representative of the state of each pixel or the like constituting an image, the invention is also applicable to, for example, encoding a multi-value index value representative of color of each pixel. When the invention is applied to those cases, multi-value information of various types is encoded by processing it as monochrome image data to be described later.

Figure 35:
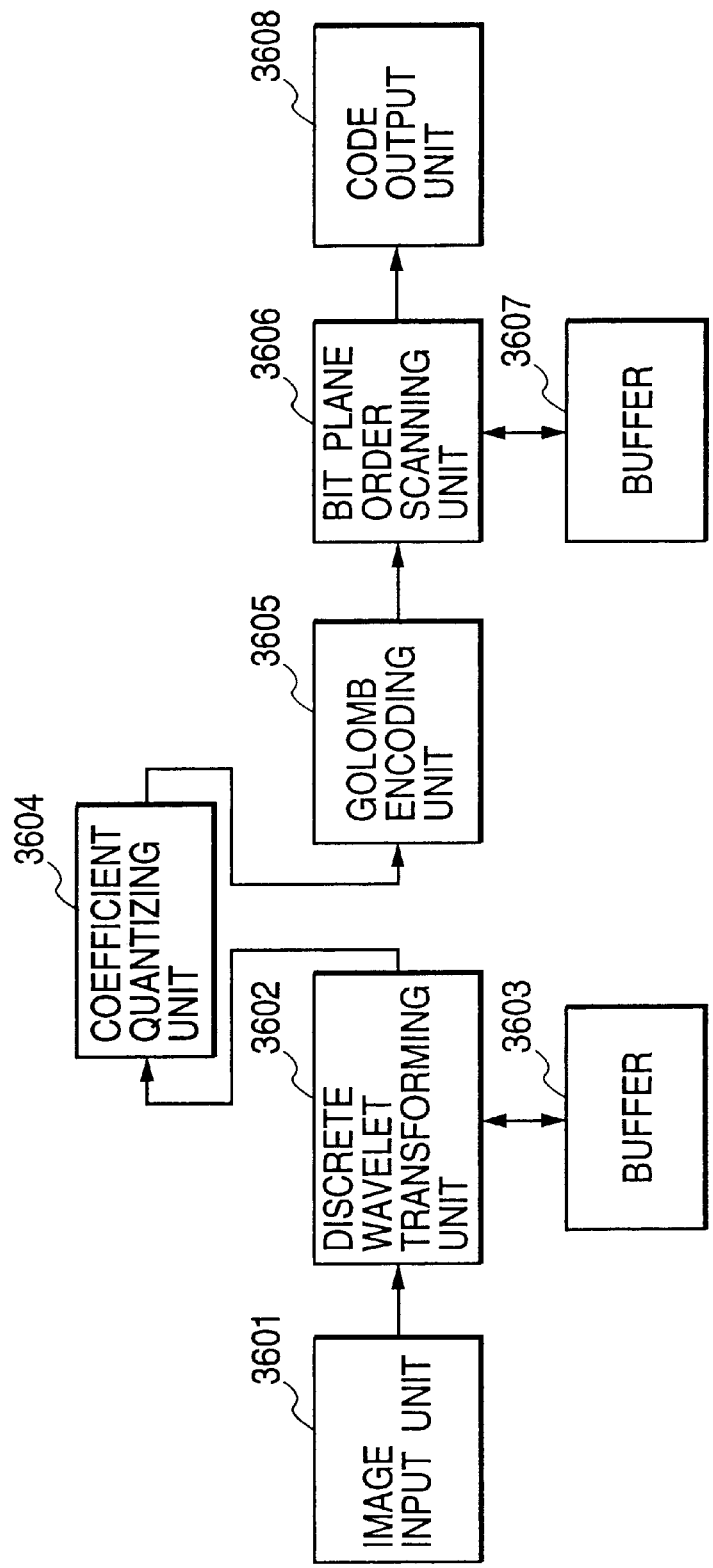
FIG. 35 is a block diagram showing an image processing apparatus according to an eleventh embodiment of the invention.

FIG. 35 is a block diagram of an image processing apparatus according to the eleventh embodiment of the invention. In FIG. 35, reference numeral 3601 represents an image input unit, reference numeral 3602 represents a discrete wavelet transforming unit, reference numeral 3603 represents a buffer, reference numeral 3604 represents a coefficient quantizing unit, reference numeral 3605 represents a Golomb encoding unit, reference numeral 3606 represents a bit plane sequential (order) scanning unit, reference numeral 3607 represents a buffer, and reference numeral 3608 represents a code output unit.

Image data of an image to be encoded is successively input from the image input unit 3601 in the order of raster scan. The image input unit 3601 may be a scanner, an image pickup device of a digital camera or the like, an image pickup device such as a CCD, an interface to a network, or the like. The image input unit 3601 may also be a storage device such as a RAM, a ROM, a hard disk, and a CD-ROM.

The discrete wavelet transforming unit 3602 temporarily stores image data of one frame input from the image input unit 3601 in the buffer 3603. Next, the image data of one frame stored in the buffer 3603 is subject to known discrete wavelet transform, and is separated into a plurality of frequency bands. In this embodiment, the discrete wavelet transform for an image data train x(n) is performed by the following equations:

$$r(n) = \text{floor}\{(x(2n)+x(2n+1))/2\}$$

$$d(n) = x(2n+2)-x(2n+3)+\text{floor}\{(-r(n)+r(n+2)+2)/4\}$$

where r(n) and d(n) are transform coefficients, r(n) are for low frequency components, and d(n) are for high frequency components. In the above equations, floor {X} indicates a maximum integer not larger than X. Although these transform equations are applied to one-dimensional data, two-dimensional transform is possible by performing transform in the horizontal and vertical directions. For example, the pixel data can be divided into four frequency bands (sub-blocks) LL, HL, LH, and HH such as shown in FIG. 36A.

The generated LL components are also subject to the discrete wavelet transform in the similar manner as above, so that the pixel data is divided into seven frequency components (sub-blocks) such as shown in FIG. 36B. In this embodiment, the pixel data is subject once more to the discrete wavelet transform to divide it into ten frequency blocks (sub-blocks) LL, HL3, HH3, HL2, LH2, HH2, HL1, LH1, and HH1 such as shown in FIG. 36C.

The transform coefficients are output to the coefficient quantizing unit 3604 in the order of raster scan, in the unit of sub-block, and in the order of sub-blocks LL, HL3, HH3, HL2, LH2, HH2, HL1, LH1, and HH1.

The coefficient quantizing unit 3604 quantizes each of the wavelet transform coefficients output from the discrete wavelet transforming unit 3602 at a quantizing step determined for each group of the frequency components, and outputs the quantized value to the Golomb encoding unit 3605. The quantized coefficient value Q(X) is given by the following equation, by representing the coefficient value by X and the quantizing step value for the frequency components the coefficient value belongs by q:

$$Q(X) = \text{floor}\{(X/q)+0.5\}$$

where floor (X) indicates a maximum integer not larger than X. A correspondence between the frequency components and the quantizing step of this embodiment is shown in FIG. 37. As shown in FIG. 37, the quantizing step is made large for the high frequency components (such as HL1, LH1, and HH1) than for the low frequency components (such as LL).

The Golomb encoding unit 3605 encodes the coefficient value quantized by the coefficient quantizing unit 3604, and outputs a code. The encoded data for the quantized value is constituted of a sign bit representative of plus/minus (+/−) and a Golomb code for the absolute value of the quantized value.

The Golomb code can easily generate variable length codes by setting an encoding parameter k, the variable length codes corresponding to k occurrence frequency (occurrence possibility) distributions each having a different occurrence frequency degree of reducing its occurrence frequency from the highest occurrent frequency (0 for the Golomb coding) toward the lower occurrence frequency. More specifically, if the parameter k used for Golomb coding is set small, the pixel data group to be encoded and having a large occurrence frequency degree of reducing its occurrence frequency of pixel data to be from the highest occurrent frequency toward can be efficiently encoded, whereas if the parameter k is set large, the pixel data group having a small occurrence frequency degree of reducing its occurrence frequency of pixel data to be from the highest occurrent frequency toward can be efficiently encoded. For example, if the parameter k is set to 0 when encoding an image having a highest occurrence frequency of "0", the image data group having an occurrence frequency distribution having a large occurrence frequency reduction degree, such as a "0" occurrence frequency of ½ and a "1" occurrence frequency of ¼, can be efficiently encoded.

This embodiment provides a good encoding efficiency, particularly when a natural image is encoded. Namely, the occurrence probability distribution of transform coefficients obtained through wavelet transform of pixel data of a natural image has a tendency that the occurrence frequency of each sub-block of HL3, . . . , HH1 excepting LL components gradually reduces from the center of 0 (highest occurrence frequency) toward both the positive (+1, . . . ) and negative (−1, . . . ) sides. In the Golomb encoding, the transform coefficients (quantized values) arranged in the order of smaller absolute value such as 0, 1, 2, 3, . . . are subject to variable length encoding by assigning variable length codes starting from the shortest code in the above order.

A general natural image encoded in this embodiment has a tendency that the transform coefficients for the high frequency components (e.g., HH1) has a larger reduction degree from the highest occurrence frequency toward the lower occurrence frequency than the transform coefficients for the low frequency components (e.g., HH3). Also in this embodiment, since the transform coefficients for the high frequency components are quantized more roughly than those for the low frequency components, it can be assumed that the occurrence frequency distribution of the quantized values for the high frequency components has a reduction degree from the highest occurrence frequency (in this embodiment, 0) toward the lower occurrence frequency larger than that of the quantized values for the low frequency components. On such assumption, the encoding parameter k is set. A correspondence between the frequency components and encoding parameters k of this embodiment is shown in FIG. 38.

Since the fundamental method of the Golomb encoding to be executed by the Golomb encoding unit 605 is well known, only the fundamental operation of encoding and features of the invention will be briefly described.

The Golomb encoding unit 3605 checks the sign (plus/minus) of each of sequentially inputted quantized values, and outputs a sign (+/−) bit. Specifically, if the quantized value is 0 or plus, a sign bit of "1" is output, whereas if it is minus, a sign bit of "0" is output.

Next, the absolute value of the quantized value is subject to Golomb encoding. Each quantized value having an absolute value V and belonging to the frequency components set with the encoding parameter k is Golomb encoded in the following manner. First, V is shifted right by k-bit, and its integer value m is calculated. The Golomb code of V is a combination of m "0's" followed by "1" (hereinafter called a variable length unit) and the lower k-bit of V (hereinafter called a fixed length unit). Examples of Golomb bits for k=0, 1, and 2 are shown in FIG. 39.

In the Golomb coding, similar to the tenth embodiment, encoding and decoding can be performed without using a code list (such as a table shown in FIG. 32 indicating a correspondence between an input value and a variable length code), so that the apparatus structure can be simplified. Also in the Golomb coding, as described with FIG. 32 of the tenth embodiment, while the variable length codes are checked sequentially and hierarchically from the upper bits, the range of decoded values for the following lower bits can be sequentially limited. Therefore, when these variable length codes are hierarchically output for each bit plane, the reception side can recognize the outline of a decoded image quickly and efficiently.

The sign (+/−) and Golomb encoded data of each input quantized value generated as above are output to the bit plane sequential scanning unit 3606.

The bit plane sequential scanning unit 3606 processes on the frequency components (sub-block) unit basis. The encoded data of one set of frequency components (one sub-block of LL to HH1) is stored in the buffer 3607.

The sign (+/−) bit of each pixel generated by the Golomb encoding unit 3605 is stored in a sign bit plane.

The start bit of the Golomb code in the variable length unit of each pixel is stored in a variable length unit first bit plane, and the second bit is stored in a variable length unit second bit plane. Similarly, the third and following bits are sequentially stored in variable length unit third and following bit planes.

The start bit of the Golomb code in the fixed length unit of each pixel is stored in a fixed length unit first bit plane, and the second bit is stored in a fixed length unit second bit plane. Similarly, the third and following bits are sequentially stored in fixed length unit third and following bit planes.

In the above manner, the encoded data of each pixel is stored in the buffer 3607 as a plurality of bit planes.

For example, if the absolute value V to be encoded is "10", the Golomb encoding unit 3605 encodes so that the sign bit is "0", the absolute variable length unit is "001" and the absolute fixed length unit is "10". In this case, "0" is stored in the variable length unit first bit plane, "0" is stored in the variable length unit second plane, "1" is stored in the variable length unit third bit plane, "1" is stored in the fixed length unit first bit plane, and "0" is stored in the fixed length unit second bit plane. If the absolute value V is "6", i.e., if the variable length unit is "01", bit information is not stored in the variable length unit third bit plane.

FIG. 40 shows a data series "3, 4, −2, −5, −8, −17, −20, 0,1, . . . " of coefficients (quantized values) of HL3 frequency components encoded by the Golomb encoding unit 3605 and stored in bit planes.

Blanks (indicated by x and Δ in FIG. 40) have no bit information stored therein because the encoded data was terminated at their upper level planes. The bit plane sequential scanning unit 3606 receives encoded data of one set of frequency components (one sub-block of LL to HH1) from the Golomb encoding unit 3605 and stores it in the butter 3607. Thereafter, it reads information from each bit in the order of raster scan, from the sign bit plane, variable length first bit plane, variable length second bit plane, . . . , variable length last bit plane, fixed length first bit plane, fixed length second bit plane, . . . , i.e., in the order of first variable length units and then fixed length units, from the upper to lower bit planes, and outputs it to the code output unit 3608.

Similar to the tenth embodiment, in the eleventh embodiment, the total number of bit planes is limited. The variable length unit bit planes are limited to variable length bit planes 1' to 4'.

Specifically, the variable length bit planes 1' to 3' are generated in accordance with the first to third bit planes and the sign bit plane stored in the buffer 3607, and the variable length bit plane 4' contains all bits in the fourth and following bit planes. This method is basically the same as the method of generating the bit planes 1' to 4' from the variable length codes of the tenth embodiment, and so the description thereof is omitted.

Similar to the tenth embodiment, since the variable length encoding is performed before the encoded data is stored in bit planes, there is a tendency that the number of blanks (indicated by x or Δ) increases more at the lower bit plane. Therefore, the number of processes of confirming the blank (indicated by x or Δ) becomes larger at the lower bit plane. Therefore, also in this embodiment, in order to reduce the number of such confirmation processes, as the method of outputting the variable length bit plane 4', the same method of outputting the fourth bit plane of the tenth embodiment is used to thereby speed up the encoding process. Since the confirmation process for the fixed length first and second bit planes are not necessary, the bit planes are directly output without regeneration of specific bit planes, after the variable length bit planes 1' to 4' are output.

As seen from FIG. 40, for example, the variable length unit of the Golomb code corresponding to the coefficient value (quantized value) of "−20" has six bits. If the bit planes 4', 5', . . . are generated by the same method as that of generating the first to third bit planes 1' to 3', all the blanks indicated by x and Δ shown in FIG. 40 are required to be checked. In contrast, in the embodiment, since the bit plane 4' (last bit plane) is generated, high speed encoding is possible because only the blank indicated by x shown in FIG. 40 is confirmed.

Figure 41:
FIG. 41 shows a code train output from a bit plane sequential scanning unit 3606.

FIG. 41 shows the format of bit information stored in the buffer 3607 and output in the order of bit plane.

The data in the sign (+/−) bit plane shown in FIG. 40 is not output as an independent bit plane, but the bit (0/1) is added to the end of the bit plane which contains a bit capable of judging that the quantized value is not "0" (requires plus or minus sign) while the variable length unit upper to lower bit planes are output and then fixed length unit upper to lower bit planes are output.

Referring to FIG. 40, when generating the variable length unit first bit plane 1', it can be judged that the plus/minus sign is necessary because the first bit of the code for the quantized value having a relatively large absolute value such as "4", "−5", "−8", "−17", and "−20" is "0". Therefore, the sign data "0, 1, 1, 1, 1" corresponding to the quantized values "4", "−5", "−8", "−17", and "−20" is added to the end of the variable length unit bit plane 1'. The next variable length unit bit planes 2' to 4' are processed in the similar manner as above. However, since the remaining quantized values "3", "−2", "1", and "0" cannot be discriminated, the sign bit is not added to the variable length bit planes 2' to 4'. When generating the next fixed length unit first bit plane, it can be judged that the plus/minus sign is necessary because the first bit of the code in the fixed length unit for the quantized values "3" and "−2" is "0" and the quantized value is not "0". Therefore, the sign data "0, 1" corresponding to the quantized values "3" and "−2" is added to the end of the fixed length first bit plane. Similarly, when generating the fixed length unit second bit plane, it can be judged that the plus/minus sign is necessary because the first bit of the code in the fixed length unit for the quantized value "1" is "1" and the quantized value is not "0". Therefore, the sign data "0" corresponding to the quantized values "1" is added to the end of the fixed length second bit plane. Similarly, the sign bit is added to another bit plane depending upon the quantized value.

The hierarchical output of the bit planes is performed in the order from the low frequency components sub-block LL, to HL3, LH3, HH3, HL2, LH2, HH2, HL1, LH1, and to HH1.

The code output unit 3608 sequentially and hierarchically transmits a plurality set of bit plane data. The code output unit 3608 may be an interface to a public telephone line, a radio line, a LAN or the like, or a storage device such as a hard disk, a RAM, a ROM, and a DVD.

With the above coding process, an image is transmitted hierarchically in the order from low frequency components to high frequency components, and the reception side can recognize an outline of the image hierarchically. Furthermore, since each bit plane of frequency components is hierarchically transmitted, the reception side can recognize an outline of the image for the frequency components hierarchically. Still further, similar to the tenth embodiment, since each pixel (transform coefficient) is represented by a variable length code, the total code amount can be reduced more than a usual coding for each bit plane.

The encoded data of the embodiment is added when necessary with information necessary for the decoding side such as an image size, the number of bits per pixel, a quantization step for respective frequency components, and encoding parameters k. For example, if an image is processed in the unit of line, block, or band, the image size information is necessary.

(Modifications)

The invention is not limited only to the above embodiments. For example, in the eleventh embodiment, the discrete wavelet transform is used for encoding. The discrete wavelet transform is not limited only to that used in this embodiment, but the type of filters and a frequency band division method may be changed. Further, in place of the discrete wavelet transform, encoding using other transform methods such as DCT transform (discrete cosine transform) may also be used.

Also the method of quantizing frequency components and variable length encoding are not limited only to the above embodiments. For example, one frequency components set (sub-block) may be further divided into smaller blocks, and the local characteristics of performance of smaller blocks are discriminated to classify them into classes. The quantization step and encoding parameter are finely set for each class.

The configuration of Golomb encoding is not limited only to that used in the above embodiments. In the above embodiments, the Golomb code having an integer V not negative and belonging to the frequency components assigned the encoding parameter k is a combination of m (obtained by shifting V by k-bit right) "0's" followed by "1" (called a variable length part) and the lower k-bit of V (called fixed length part). Instead, the use of "0" and "1" may be reversed to generate the Golomb code. Further, the Golomb code may be either the variable length unit followed by the fixed length part or the variable length unit followed by the fixed length unit.

In the above embodiments, the wavelet transformed transform coefficients (quantized values) are Golomb encoded by setting the encoding parameters k on the assumption that the transform coefficient "0" occurs at the highest occurrence frequency. The invention is not limited only thereto so long as the encoding parameter is set so that the Golomb encoding can be performed efficiently in accordance with the occurrence frequency of each transform coefficient. For example, the occurrence frequency of each transform coefficient to be variable-length encoded may be actually analyzed to set the optimum encoding parameters k allowing more efficient encoding.

Also in the above embodiments, a plurality of bit planes constituting one sub-block are all output hierarchically, and thereafter all the planes of the next sub-block are hierarchically output, during the hierarchical encoding. The hierarchical encoding may be performed by other methods. For example, after a first bit plane constituting the first sub-block is output, the first bit plane constituting the next sub-block may be output. After the first plane for all the sub-blocks are output, the second bit plane constituting the first sub-block is output to follow similar operations as above.

(Applications to Other Embodiments)

The techniques of the present invention are applicable to a system constituted by a plurality of apparatuses (e.g., a host computer, interface units, a reader, a printer, and the like) or to a system constituted by a single apparatus (e.g., a copier, a fax, or a digital camera).

The invention is not limited only to the apparatus and method for realizing the embodiments. The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, constitute the present invention.

The storage medium storing such program codes may be a floppy disk, a hard disk, an optical disk, a magneto-optical disk, a CD-ROM, a magnetic tape, a non-volatile memory card, a ROM, and a like.

Such program codes are other types of embodiments of this invention, not only for the case wherein the embodiment functions are realized by executing the program codes supplied to the computer and controlling various devices but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

As described so far, according to the present invention, variable length encoding is executed before bit plane encoding. It is therefore possible to efficiently recognize the outline of an image at an earlier stage from a fraction of encoded data, to thereby allow hierarchical encoding at high speed and high compression factor.

Further, according to the invention, since variable length encoding is used, encoded data can be generated efficiently even there is a possibility that the number of bit planes increases.

What is claimed is:

1. An image processing apparatus comprising:
   means for generating a plurality of coefficients representative of an image;
   variable length encoding means for encoding each of the generated plurality of coefficients to obtain variable length encoded data corresponding to each coefficient; and
   hierarchical output means for distributing each bit of the variable length encoded data to a plurality of bit planes each corresponding to a level of each bit, and hierarchically and sequentially outputting the plurality of bit planes from most significant bit (MSB) to least significant bit (LSB),
   wherein said variable length encoding means executes variable length encoding for each of the plurality of coefficients, and
   in the hierarchical output by said hierarchical output means, the output of the bit plane of a certain level is skipped so as not to output a blank bit corresponding to the position of the variable length encoded data of a short length.

2. An image processing apparatus according to claim 1, wherein the variable length encoded data obtained through the variable length encoding includes a Golomb code.

3. An image processing apparatus according to claim 1, wherein the plurality of coefficients are transform coefficients obtained by transforming image data representative of the image into frequency components.

4. An image processing apparatus according to claim 3, wherein the transform into the frequency components is performed by wavelet transform.

5. An image processing apparatus according to claim 3, wherein the transform into the frequency components is performed by DCT transform.

6. An image processing apparatus according to claim 1, wherein said hierarchical output means makes each bit plane to be hierarchically output subject to run-length encoding.

7. An image processing apparatus according to claim 1, wherein said hierarchical output means hierarchically outputs each bit plane subject to arithmetic encoding.

8. An image processing apparatus according to claim 1, wherein said hierarchical output means distributes an n-th bit (1<n) of the variable length encoded data of each coefficient obtained through the variable length encoding, to an n-th bit plane of the plurality of bit planes.

9. An image processing apparatus according to claim 1, wherein said variable length encoding means selects an encoding parameter corresponding to an occurrence frequency distribution of each coefficient among the plurality of coefficients generated by said generating means.

10. An image processing apparatus according to claim 9, wherein the selection of the encoding parameter is performed in accordance with a ratio of the number of each coefficient to the number of the plurality of coefficients.

11. An image processing apparatus according to claim 9, wherein the selection of the encoding parameter is performed in accordance with a histogram formed by using the plurality of coefficients.

12. An image processing apparatus according to claim 9, wherein the selection of the encoding parameter is performed in accordance with a maximum coefficient value of the plurality of coefficients.

13. An image processing apparatus according to claim 9, wherein the selection of the encoding parameter is performed in accordance with an accumulated value of the plurality of coefficients.

14. An image processing apparatus according to claim 1, wherein said hierarchical output means distributes each bit of variable length encoded data corresponding to each coefficient and obtained through variable length encoding by said variable length encoding means, to a plurality of bit planes each corresponding to a level of each bit, and hierarchically and sequentially outputs a limited number of bit planes of the plurality of bit planes.

15. An image processing apparatus according to claim 1, wherein said hierarchical output means generates n-th (1<n<M) bit plane data of the plurality of bit planes by using n-th bits of the variable length encoded data of each coefficient obtained by the variable length encoding, and generates m-th bit plane data by using the variable length encoded data from m-th bits (m<M) to M-th bits.

16. An image processing apparatus according to claim 15, wherein said generating means generates the m0 bit plane data as a lowest level bit plane data.

17. An image processing method comprising the steps of:
generating a plurality of coefficients representative of an image;
variable length encoding each of the generated plurality of coefficients to obtain variable length encoded data corresponding to each coefficient; and
distributing each bit of the variable length encoded data to a plurality of bit planes each corresponding to a level of each bit, and hierarchically and sequentially outputting the plurality of bit planes from most significant bit (MSB) to least significant bit (LSB),
wherein in said variable length encoding step, variable length encoding is executed for each of the plurality of coefficients, and
in the hierarchical output in said hierarchical output step the output of the bit plane of a certain level is skipped so as not to output a blank bit corresponding to the position of the variable length encoded data of a short length.

* * * * *

UNITED STATES PATENT AND TRADEMARK OFFICE
CERTIFICATE OF CORRECTION

PATENT NO. : 6,909,811 B1
DATED : June 21, 2005
INVENTOR(S) : Kajiwara et al.

It is certified that error appears in the above-identified patent and that said Letters Patent is hereby corrected as shown below:

Column 2,
Line 60, "illustrate" should read -- illustrates --.

Column 3,
Line 32, "Fig. 34 is shows" should read -- Fig. 34 shows --.

Column 11,
Line 23, "from" should read -- form --.
Line 62, "numeral-1603" should read -- numeral 1603 --.

Column 19,
Line 59, "data" should read -- data is --.

Column 20,
Line 34, "it not," should read -- if not, --.

Column 21,
Line 4, "cally." should read -- cal. --.

Column 24,
Line 12, "is" should read -- are --.

Column 31,
Line 46, "even" should read -- even though --.

Signed and Sealed this

Eleventh Day of April, 2006

JON W. DUDAS
*Director of the United States Patent and Trademark Office*